US009342814B2

(12) United States Patent
Lieb et al.

(10) Patent No.: US 9,342,814 B2
(45) Date of Patent: May 17, 2016

(54) PRESENTATION ACCESS TRACKING SYSTEM

(75) Inventors: Adam Michael Lieb, San Francisco, CA (US); James L. Benton, San Francisco, CA (US)

(73) Assignee: CLEARSLIDE, INC., San Francisco, CA (US)

(*) Notice: Subject to any disclaimer, the term of this patent is extended or adjusted under 35 U.S.C. 154(b) by 476 days.

(21) Appl. No.: 12/756,145

(22) Filed: Apr. 7, 2010

(65) Prior Publication Data

US 2010/0257456 A1 Oct. 7, 2010

Related U.S. Application Data

(60) Provisional application No. 61/264,185, filed on Nov. 24, 2009, provisional application No. 61/167,516, filed on Apr. 7, 2009.

(51) Int. Cl.
*G06F 3/00* (2006.01)
*G06Q 10/10* (2012.01)
(Continued)

(52) U.S. Cl.
CPC ............... *G06Q 10/10* (2013.01); *H04L 67/02* (2013.01); *G06F 17/30056* (2013.01); *H04N 1/00198* (2013.01); *H04N 21/234336* (2013.01)

(58) Field of Classification Search
CPC .................................................. G06F 17/30056
USPC ........................................ 715/730, 751, 726
See application file for complete search history.

(56) References Cited

U.S. PATENT DOCUMENTS

| 5,191,410 A | * | 3/1993 | McCalley et al. ............. 725/114 |
| 5,437,555 A | * | 8/1995 | Ziv-El ........................... 434/336 |

(Continued)

FOREIGN PATENT DOCUMENTS

| JP | 10260956 A | * | 9/1998 | .............. G06F 17/00 |
| WO | WO 03102828 A1 | * | 12/2003 | .............. G06F 17/60 |

(Continued)

OTHER PUBLICATIONS

Author: Brainshark Title: Brainshark tracking and reporting capabilities help you measure effectiveness Date: Oct. 12, 2007.*

(Continued)

*Primary Examiner* — Ajay Bhatia
*Assistant Examiner* — Phoebe Pan
(74) *Attorney, Agent, or Firm* — Perkins Coie LLP

(57) ABSTRACT

A system comprises a database configured to store a presentation, the presentation having a presentation identifier and comprising a sequence of discrete presentation items, a first discrete presentation item of the plurality being associated with first content with first content type and a second discrete presentation item of the sequence being associated with second content of a second content type. A presenter interface is configured to receive viewer identification information identifying a viewer to which the presentation is to be made accessible. An access controller is configured to create an access credential using both the presentation identifier and the viewer identification information, the access credential to enable access to the presentation by a viewer computer system. A tracker configured to generate access history data pertaining to access by the viewer computer system to each of the sequence of discrete presentation items. The presenter interface is further configured to present the access history data to a presenter computer system.

36 Claims, 29 Drawing Sheets

(51) Int. Cl.
*H04L 29/08* (2006.01)
*H04N 1/00* (2006.01)
*H04N 21/2343* (2011.01)
*G06F 17/30* (2006.01)

(56) References Cited

U.S. PATENT DOCUMENTS

| | | | |
|---|---|---|---|
| 5,537,141 A * | 7/1996 | Harper et al. | 725/116 |
| 5,974,135 A * | 10/1999 | Breneman et al. | 379/265.04 |
| 6,008,807 A | 12/1999 | Bretschneider et al. | |
| 6,041,333 A | 3/2000 | Bretschneider et al. | |
| 6,363,352 B1 * | 3/2002 | Dailey et al. | 705/7.19 |
| 6,560,637 B1 | 5/2003 | Dunlap et al. | |
| 6,646,655 B1 * | 11/2003 | Brandt et al. | 715/723 |
| 6,659,861 B1 * | 12/2003 | Faris et al. | 463/1 |
| 6,725,219 B2 | 4/2004 | Nelson et al. | |
| 6,728,753 B1 | 4/2004 | Parasnis et al. | |
| 6,820,111 B1 * | 11/2004 | Rubin et al. | 709/203 |
| 6,836,870 B2 | 12/2004 | Abrams | |
| 6,839,059 B1 | 1/2005 | Anderson et al. | |
| 6,922,702 B1 | 7/2005 | Jensen et al. | |
| 6,938,032 B1 * | 8/2005 | Heath et al. | |
| 6,968,506 B2 * | 11/2005 | Yacovone et al. | 715/730 |
| 6,988,138 B1 * | 1/2006 | Alcorn et al. | 709/225 |
| 7,039,643 B2 * | 5/2006 | Sena et al. | 707/691 |
| 7,058,891 B2 | 6/2006 | O'Neal et al. | |
| 7,237,189 B2 * | 6/2007 | Altenhofen et al. | 715/201 |
| 7,290,204 B1 | 10/2007 | Kanno et al. | |
| 7,369,808 B2 * | 5/2008 | Wessner et al. | 434/350 |
| 7,454,708 B2 | 11/2008 | O'Neal et al. | |
| 7,493,396 B2 * | 2/2009 | Alcorn et al. | 709/225 |
| 7,493,561 B2 | 2/2009 | Sareen et al. | |
| 7,546,533 B2 | 6/2009 | Sareen et al. | |
| 7,558,853 B2 * | 7/2009 | Alcorn et al. | 709/225 |
| 7,590,939 B2 | 9/2009 | Sareen et al. | |
| 7,613,685 B2 * | 11/2009 | Jaepel et al. | |
| 7,631,254 B2 * | 12/2009 | Layard et al. | 715/202 |
| 7,698,360 B2 * | 4/2010 | Rowley et al. | 709/203 |
| 7,707,642 B1 * | 4/2010 | Herbach et al. | 726/27 |
| 7,765,468 B2 * | 7/2010 | Munetsugu et al. | 715/236 |
| 7,774,751 B2 * | 8/2010 | Zhuk | 717/120 |
| 7,853,608 B2 * | 12/2010 | Sareday et al. | 707/769 |
| 7,856,473 B2 * | 12/2010 | Horikiri et al. | 709/205 |
| 7,913,312 B2 * | 3/2011 | de Jong | 726/29 |
| 8,021,164 B2 * | 9/2011 | Epstein | 434/322 |
| 8,082,509 B2 * | 12/2011 | Orsolini et al. | 715/751 |
| 2002/0109712 A1 * | 8/2002 | Yacovone et al. | 345/732 |
| 2003/0130979 A1 * | 7/2003 | Matz et al. | 707/1 |
| 2003/0139174 A1 * | 7/2003 | Rao | 455/418 |
| 2003/0182375 A1 * | 9/2003 | Zhu et al. | 709/205 |
| 2003/0217008 A1 * | 11/2003 | Habegger et al. | 705/51 |
| 2004/0128169 A1 * | 7/2004 | Lusen | 705/3 |
| 2004/0153972 A1 * | 8/2004 | Jaepel et al. | 715/530 |
| 2004/0221309 A1 * | 11/2004 | Zaner et al. | 725/46 |
| 2004/0243969 A1 | 12/2004 | Kamery et al. | |
| 2005/0039129 A1 * | 2/2005 | Paul | 715/730 |
| 2005/0039130 A1 * | 2/2005 | Paul | 715/730 |
| 2005/0039131 A1 * | 2/2005 | Paul | 715/730 |
| 2005/0097061 A1 * | 5/2005 | Shapiro et al. | 705/67 |
| 2005/0151756 A1 * | 7/2005 | Miyamoto et al. | 345/619 |
| 2005/0251731 A1 * | 11/2005 | Valderas et al. | 715/500 |
| 2005/0287509 A1 * | 12/2005 | Mohler | 434/350 |
| 2005/0289453 A1 * | 12/2005 | Segal et al. | 715/512 |
| 2006/0134593 A1 * | 6/2006 | Kalous et al. | 434/350 |
| 2006/0242632 A1 * | 10/2006 | Orsolini et al. | 717/140 |
| 2006/0248144 A1 * | 11/2006 | Zhu et al. | 709/205 |
| 2006/0277454 A1 * | 12/2006 | Chen | 715/500.1 |
| 2007/0016553 A1 * | 1/2007 | Dumais et al. | 707/2 |
| 2007/0100882 A1 * | 5/2007 | Hochwarth et al. | 707/104.1 |
| 2007/0113187 A1 * | 5/2007 | McMullen et al. | 715/742 |
| 2008/0052742 A1 | 2/2008 | Kopf et al. | |
| 2008/0065974 A1 | 3/2008 | Campbell | |
| 2008/0189328 A1 * | 8/2008 | Sareday et al. | 707/104.1 |
| 2008/0209330 A1 | 8/2008 | Cruver | |
| 2008/0254434 A1 * | 10/2008 | Calvert | 434/350 |
| 2008/0320082 A1 | 12/2008 | Kuhlke et al. | |
| 2009/0162822 A1 * | 6/2009 | Strachan et al. | 434/309 |
| 2009/0249446 A1 * | 10/2009 | Jenkins et al. | 726/3 |
| 2009/0259944 A1 * | 10/2009 | Wu | 715/738 |
| 2010/0023849 A1 * | 1/2010 | Hakim et al. | 715/202 |
| 2010/0132020 A1 * | 5/2010 | Paul | 726/7 |
| 2010/0169951 A1 * | 7/2010 | Vaughan et al. | 726/3 |
| 2010/0174773 A1 * | 7/2010 | Penner et al. | 709/203 |
| 2010/0228825 A1 * | 9/2010 | Hegde et al. | 709/204 |
| 2010/0228989 A1 * | 9/2010 | Neystadt et al. | 713/185 |
| 2014/0010520 A1 * | 1/2014 | Bhatia et al. | 386/278 |

FOREIGN PATENT DOCUMENTS

| | | |
|---|---|---|
| WO | WO-2007001639 A2 | 1/2007 |
| WO | WO-2007092470 A2 | 8/2007 |

OTHER PUBLICATIONS

"International Application Serial No. PCT/US10/30303, Search Report mailed Jun. 9, 2010", 3 pgs.

"International Application Serial No. PCT/US10/30303, Written Opinion mailed Jun. 9, 2010", 8 pgs.

Blitstein. S., "SlideRocket Opens for Business", *WebWorkerDaily*, [retrieved May 25, 2010] Retrieved from the Internet. <URL: http://webworkerdaily.com/2oo8l10128/sliderocket-opens-for-business!> (Oct. 28, 2008), 11 pgs.

* cited by examiner

FIG. 18

Email Pitches >

Newmark Knight Frank (Retail) / Jenny Benton (13 slides total)

Link (Copy-and-Paste): http://clearslide.com/view/mail?ID=SPL57XZ3T4N4MYGW5X53 | Preview this Pitch

2602

Viewer Details:

*Viewer #1*
Location: New York, NY, US (212 area code; NEWMARK & COMPANY)
Name: Jenny Benton (original recipient)
View Stats: 3 hours ago (Mon, 4/6/09, 8:49 AM PDT)
Duration: 4 minutes, 23 seconds (13 slide views)

2604

View Settings:
Owned By: Jim Benton
Presentation(s): ClearSlide Offline Deck
Prospect Company: Newmark Knight Frank (Retail)
Recipient Name: Jenny Benton
Notes: No notes entered

Latest Activity Post message or link

2800

👤 Mark Jones just joined. Welcome to ClearSlide.
7 days ago

Al Lieb had a 1 minute live pitch with Test Test (view details)
8 days ago

Al Lieb had a 1 minute live pitch with Test Test (view details)
8 days ago

✤ Al Lieb added a new presentation: ClearSlide Overview - REPv1PPT
8 days ago

*FIG. 28*

PRESENTATION ACCESS TRACKING SYSTEM

CROSS-REFERENCE TO RELATED PATENT DOCUMENTS

This patent application claims the benefit of priority, under 35 U.S.C. Section 119(e), to U.S. Provisional Patent Application Serial No. 61/167,516, filed on Apr. 7, 2009, and to U.S. Provisional Patent Application Serial No. 61/264,185, filed on Nov. 24, 2009, both of which are incorporated herein by reference in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010, ClearSlide, Inc., All Rights Reserved.

TECHNICAL FIELD

This application relates to information presentation in a computer-implemented environment. One example embodiment relates specifically a method to remotely present a presentation file to a viewer computer system over a communications network (e.g., the Internet).

BACKGROUND

Presentation software tools, such as MICROSOFT POWERPOINT™, are a widely used for presenting information. They are useful to distill a narrative, such as a sales pitch or company update, into a series of easily digestible slides. However, it may be difficult to display presentations to viewers when they are in remote locations.

One solution is to send the full presentation file to viewers via email or similar file transfer service. This solution may present technical difficulties since: (a) the presenter must ask for the viewers' email addresses or contact information; (b) the presentation files are generally large and may be a slow to upload and/or download or exceed maximum email limits; (c) the viewers are required to have the proper software installed; (d) if intended for a live presentation, both the viewers and presenter must manually advance the slides and attempt to "sync up" with the presenter based on verbal cues; (e) there are no means for the presenter to visually indicate a specific point of interest on a slide during a live presentation; and (g) if the viewer opens the presentation asynchronously, there is no way to provide data back to the sender regarding when it was opened, which slides were viewed, etc.

Another method of sharing a presentation file is called "screen casting", where the presenter opens the presentation on his computer and then broadcasts the entire contents of his monitor display to the viewers. Several commercial solutions such as WEBEX™ and GOTOMYPC™ use this technique. Example technical difficulties with this technique may include: (a) the presenter must download and install software on their computer; (b) these services often require a time-consuming viewer setup process (e.g., including software downloads or an email-based invitation setup process) to connect the viewer to the presenter; (c) screen casting requires a lot of bandwidth to send a full video of the presenters screen and may often result in slow updates or momentary screen freezes for the viewers, and may not work at all over slower network connections; (d) the presentation software only processes video data and does not have an understanding of the actual slides displayed; and (e) these screen casting methods are limited specifically to live synchronous presentations. They do not provide a way to display the presentation to the viewer asynchronously, without the presenter's direct involvement.

BRIEF DESCRIPTION OF DRAWINGS

Some embodiments are illustrated by way of example and not limitation in the figures of the accompanying drawings in which:

FIG. 18 is a screenshot of an email pitch dialogue box, according to some example embodiments, that may be used to facilitate a synchronous presentation to a viewer computer system.

FIG. 26 is a detailed statistics and timeline interface, according to some example embodiments, for a single asynchronous presentation.

FIG. 28 is a screenshot of a latest activity interface, according to some example embodiments.

DETAILED DESCRIPTION

Figure 1:
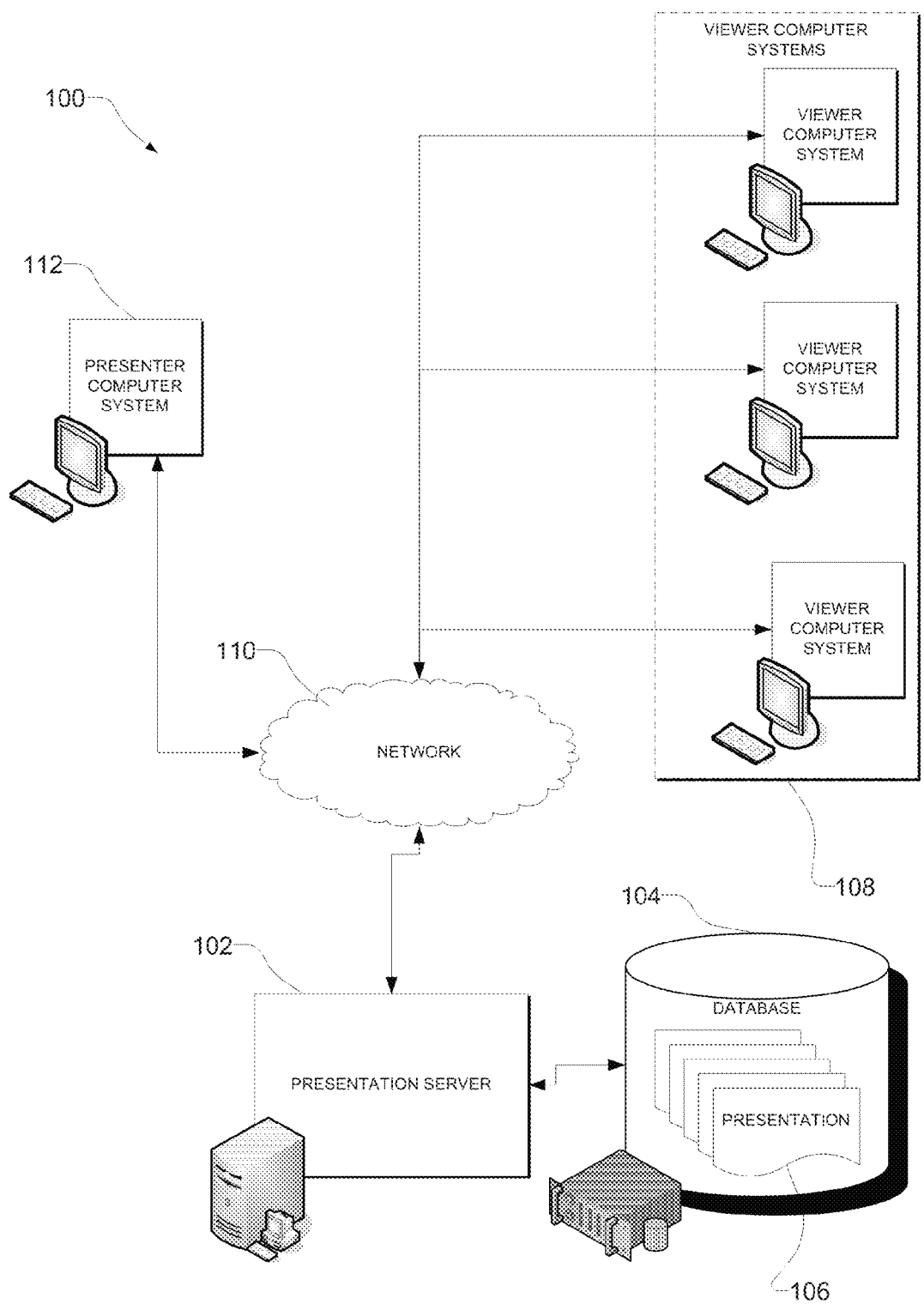
FIG. 1 is a block diagram illustrating an environment within which an example embodiment may be deployed.

In the following description, for purposes of explanation, numerous specific details are set forth in order to provide a thorough understanding of some example embodiments. It will be evident, however, to one skilled in the art that the present invention may be practiced without these specific details.

Various example methods and systems are described herein for the display of a presentation (e.g., a set or sequence of slides), in either a synchronous (e.g., live) presentation between a presenter computer system and a viewer computer system, or an asynchronous manner (e.g., where a viewer computer system accesses a presentation independently of control from a presenter). A presenter may upload a presentation (e.g., a PowerPoint deck of slides) to a presentation server (e.g. a website server), which then converts the presentation into a series of presentation items (e.g. images). Any user of a presentation team, if given permission, may then edit the presentation via the presentation server, by adding, removing, temporarily hiding, or reordering presentation items, or by adding other content to the presentation (e.g., video or web pages).

Once a presentation on the remote presentation server is deemed to be ready, any presenter of a presentation team, if given permission, may present the presentation live to viewer computer systems via a network (e.g., the Internet), or alternatively provide viewer computer systems with a synchronous access to the presentation. In the case of a synchronous (e.g., live) presentation, a presenter, while operating a presenter computer system, selects a presentation from multiple presentations that are presentable via the presentation server. The presenter then provides a location identifier (e.g., a Uniform Resource Locator (URL)), which is unique to the presenter, to one or more viewers that are accessing respective viewer computer systems. When a viewer inputs the relevant URL into a web browser hosted on a viewer computer system, the viewer is presented with a presentation item (e.g., image) that is currently selected by the presenter for presentation from the presentation server. The presenter may be provided with feedback as to which of the viewer computer systems is currently accessing the presentation, as well as the geographic locations of such viewer computer systems. The presenter is furthermore provided with the option of advancing to a particular presentation item (e.g. slide) of a presentation, or selecting a different presentation to be presented via the presentation server to the viewer computer systems.

The presenter may furthermore select a location on a specific presentation item (e.g., by clicking on a point of a slide), and a highlight marker icon is displayed on presentation items delivered to the viewer computer systems. The presenter may furthermore turn on a 'secure mode', which requires all viewers to enter a specific password or other credential in order to view (or continue to view) a particular presentation.

A presenter may also be presented with an index of presentation items (e.g., a slide index), which the presenter may use to jump to a specific presentation of item in an out of order manner. A presenter may also close the presentation, and the presentation is then ended for all viewers by the presentation server.

Turning now to an asynchronous example embodiment, a presenter may construct a web URL, which uniquely identifies a presentation (or set of presentations) and a specific viewer. The presenter may then communicate this URL to a viewer computer system, e.g. by email or some other communication means. When a viewer, using a viewer computer system, clicks on the link, the viewer may access and view the presentation in an asynchronous manner, and advance the slides at their leisure.

For both the synchronous and asynchronous example embodiments, the presentation server may track access activity and generate detailed historical access data (e.g. statistics), including the identity of the presenter, geographic location and other information pertaining to viewer computer systems, which presentation items were displayed and for how long, and/or a total duration of a presentation session, etc. The presentation server may then analyze and display this data in various formats, such as reports and graphs, which may display total view time per presenter or presentation team, compare specific presenter computer systems or viewer computer systems, and/or compare specific presentations etc.

FIG. 1 is a block diagram illustrating an environment 100, within which a presentation server 102, according to an example embodiment may be deployed. While only a single presentation server 102 is shown in FIG. 1, some example embodiments (e.g., a cloud computing environment) may deploy multiple presentation servers in order to provide the functionality described herein. The presentation server 102 is communicatively coupled, and has access to, one or more databases 104. The databases 104 store presentations that the presentation server 102 operatively presents or makes accessible to multiple viewer computer systems 108 via a network 110 (e.g., the Internet). One or more presenter computer systems 112 may also be communicatively coupled to the presentation server 102 via the network 110. The presentation server 102 may facilitate a synchronous delivery or display of a presentation 106 to one or more viewer computer systems 108, under the control and direction of a presenter controlling the presenter computer system 112. For the purposes of the present application, the term 'synchronous presentation' shall be deemed to refer to a presentation in which a presenter controls content that is presented or displayed to one or more viewers at the same time.

In another example embodiment, the presentation server 102 may facilitate an asynchronous presentation of a presentation 106 to one or more viewer computer systems 108. For the purposes of the present application, the term 'asynchronous presentation' shall be deemed to refer to a presentation of content in which a viewer controls content that is presented to the viewer.

Figure 2:
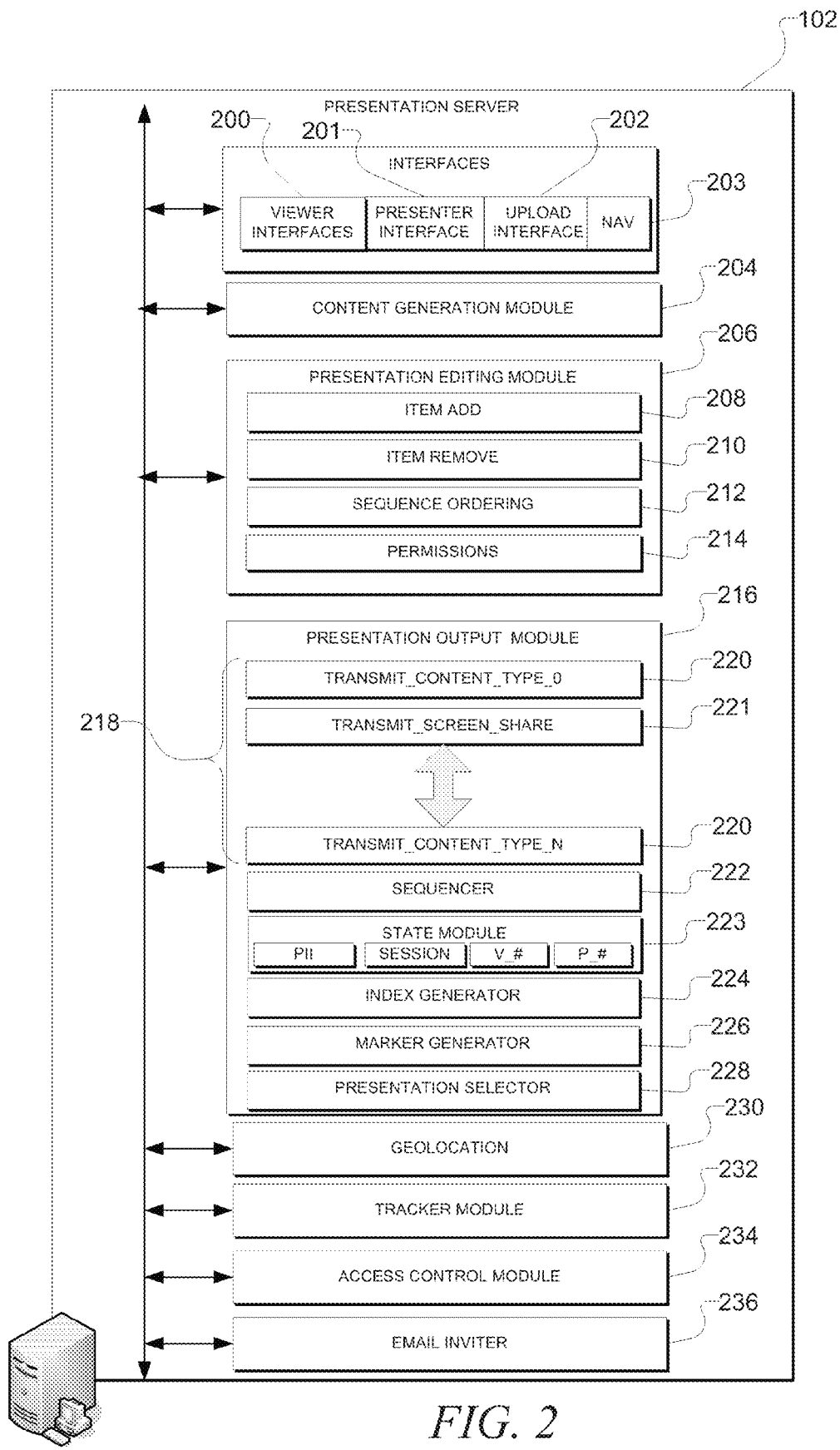
FIG. 2 is a block diagram illustrating architecture of a presentation server, according to an example embodiment.

FIG. 2 is a block diagram illustrating architecture of a presentation server 102, according to some example embodiments. As will be described in further detail below, the presentation server 102 supports a number of methods and operations. A brief description of the various modules and components that are included within the presentation server 102 is provided with reference to FIG. 2, while a more complete description of the various functions performed by these modules and components is provided with respect to the various flowcharts that follow in subsequent figures. Each of the components and modules is shown in FIG. 2 to be communicatively coupled to each of the other modules or components so as to facilitate data transfer and interactions between the various modules and components.

The presentation server 102 includes multiple interfaces through which data is received at the presentation server 102, and through which data is transmitted or communicated from the presentation server 102. In one example embodiment, these interfaces may broadly be categorized as viewer interfaces 200 and presenter interfaces 201. The viewer interfaces 200 are configured and operate to exchange data (e.g., receive input from, and output data to) one or more viewer computer systems 108. Similarly, the presenter interfaces 201 are configured and operated to receive data from, and output data to, one or more presenter computer systems 112. In one example embodiment, the interfaces 200 and 201 may, in some example embodiments, embody HTTP request and response objects so as to enable the presentation server 102 to communicate with JavaScript executing on presenter and viewer computer systems 112 and 108.

The presenter interfaces 201 are shown to further include an upload interface 202. In order to support the upload of presentation content to the presentation server 102, the upload interface 202 is accessible to external computer systems (e.g., a presenter computer system 112) via the network 110.

A content generation module 204 operatively generates presentation items (e.g., images) based on a content that is uploaded to the presentation server 102 via the upload interface 202. For example, the content generation module 204 may convert a deck of POWERPOINT slides into a set of discrete presentation images (e.g., JPEG, GIF, TIFF, PNG, RAW or BMP images). In some example embodiments, the content generation module 204 may operatively convert a wide variety of content types into a reduced set of content types that are presented by the presentation server 102. For example, as will be described in further detail below, the presentation server 102 may include a set of converters that render to a set of content types that are optimized for presentation over the Internet. The content generation module 204 may, in one example embodiment, operate to convert a wide variety of content types into the reduced set of content types that are supported for presentation by the presentation server 102.

A presentation editing module 206 supports various functions and operations that an owner or presenter of a presentation may perform in order to edit a presentation 106. For example, the presentation editing module 206 may include an item add component 208 to support the addition of a presentation item to a sequence of presentation items that constitute the presentation. Similarly, an item remove component 210 may facilitate the removal of a presentation item from a sequence. A sequence ordering component 212 allows an owner or presenter to define or change a sequence-ordering with respect to a sequence of presentation items. A permissions module 214 enables an owner of a presentation to specify access permissions, with respect to both presenters from a group of potential presenters and viewers from a group of potential viewers, with respect to a particular presentation or group of presentations.

The presentation server 102 includes a presentation output module 216, which operates to generate and transmit presentation items of one or more presentations to a viewer computer system 108, as part of either a synchronous or asynchronous presentation delivery. The presentation output module 216 is shown to include a set 218 of transmitters 220, each transmitter being dedicated to transmitting a particular content type. For example, a first transmitter may transmit JPEG images, a second transmitter may transmit MPEG video, a fourth transmitter may transmit MP3 audio etc.

Within the set 218 of transmitters, a screen share transmitter 221 enables screen sharing between a presenter computer system 112 and a viewer computer system 108. To this end, the screen share transmitter 221 may receive an image capture of a screen that a presenter, using a presenter computer system 112, wishes to share with one or more viewer computer systems 108. The screen share transmitter 221 may then transmit the screen capture image into an appropriate format, and output the transmitted image to a viewer computer system 108.

A sequencer 222 is responsible for determining the sequence in which a set of presentation items is presented by the presentation output module 216 using sequence data (described in further detail with reference to FIG. 3).

A state module 223 maintains information regarding the current state of a presentation session, be that a synchronous or an asynchronous presentation session. To this end, the state module 223 stores a presentation item identifier that identifies a particular presentation item that is currently being presented, a session identifier to identify a current session, one or more viewer identifiers identifying viewer computer systems 108 with which the presentation session has been established, and one or more presenter identifiers identifying, when appropriate, a presenter computer system 112 that is controlling the state of the presentation.

An index generator 224 of the presentation output module 216 is configured to generate and present an index to a sequence of presentation items. The index is presented to a viewer computer system or a presenter computer system so as to enable a viewer or a presenter to select a particular presentation item and navigate a presentation to that selected presentation item. In one example embodiment, the index to the sequence of presentation items may compromise a sequence of thumbnail images that are generated from or otherwise represent a set of presentation items.

A marker generator 226 is configured to generate and present a marker icon on a presentation item that is presented to a viewer computer system 108. The location at which a marker icon is generated and presented on a presentation item displayed to a viewer computer system may be updated based on marker input received from a presenter computer system 112, the marker input identifying a location on a currently displayed presentation item.

A presentation selector 228 is configured to allow a presenter to select from a number of presentations 106, stored in the database 104, for presentation via the presentation server 102 to one or more viewer computer systems 108. To this end, the presentation selector 228 may present a listing of the multiple presentations 106 (e.g., as thumbnails or other graphical representations) to a presenter computer system 112 for selection. Responsive to receipt of a selection of one of the multiple presentations, the presentation selector 228 may then retrieve the selected presentation 106 from the database 104 into local memory of the presentation server 102.

The presentation server 102 may also include a geolocation module 230 configured to operatively determine an estimated geographic location of a viewer computer system 108 and/or a presenter computer system 112. To this end, in one example embodiment, the geolocation module 230 may capture the IP address of a viewer computer system 108 as part of a session establishment, and provide this IP address to a third party geolocation information provider. The third party geolocation information provider may then return an estimated geographic location for a viewer computer system 108. In one example embodiment, this estimated geographic location may then be presented, by a presenter interface 201, to a presenter user of a presenter computer system 112. A tracker, the example form of a tracker module 232, is configured to generate (e.g., by tracking and processing access activity) access history data reflecting access by viewer computer systems 108 to presentations 106. In one example embodiment, the tracker module 232 tracks access by individual viewer computer systems 108 to each presentation item within a sequence of presentation items that constitute a presentation. The information that is tracked by the tracker module 232 may include identification information regarding the viewer computer system (e.g., identification information regarding a viewer that is currently logged into a particular viewer computer system 108), the IP address of the relevant viewer computer system 108, and the duration of access (e.g., display) of each presentation item to the relevant viewer computer system 108. The tracker module 232 is furthermore configured to present the access history data, via a presenter interface 201, to a presenter (or owner) of a presentation. The tracker module 232 may furthermore generate access history data, for each presentation item of a sequence of presentation items, both with respect to synchronous and asynchronous presentations of the respective presentation items.

In a further example embodiment, for asynchronous presentations where a presenter (or owner) of a presentation communicates a URL to access presentation to a viewer, the tracker module 232 may generate access history data with respect to each presenter of a group of presenters. For example, for a specific presentation that is distributed via email link from a group of presenters, the tracker module 232 may generate aggregate data for the particular presentation that is reflective of the number of viewer accesses that resulted from the distribution of each of the URLs from the various presenters. In this case, each presenter may distribute a URL that identifies both the presenter that distributed the presentation, as well as the presentation itself. In further embodiment, the URL may also be uniquely associated with a viewer to which the URL was distributed, in addition to being associated with a presentation and/or the presenter that distributed the URL.

An access control module 234 is configured to generate an access credential, in the form of a URL, using which a particular presentation is accessible as an asynchronous presentation. In one example embodiment, the access control module 234 creates the access credential using both a presentation identifier, which uniquely identifies a particular presentation, and viewer identification information, which identifies a particular viewer to which the URL may be communicated. By associating the viewer identification information with the URL, access to the presentation via by the particular URL may be tracked by the tracker module 232, beyond a particular viewer computer system 108 to which the relevant URL was originally communicated. For example, a particular viewer (e.g., a sales representative of company XYZ) may originally be sent a URL that provides access to an asynchronous delivery of a particular presentation. The particular sales representative of company XYZ may then decide to forward the relevant URL on to other viewers. Subsequent accesses to the presentation by further viewers may then be tracked and also traced back to the original recipient of the URL.

The access control module 234 may also enforce editing permissions reflected in the permissions module 214 of the presentation editing module 206, and may selectively allow modifications to a sequence of presentation items based on editing permissions stored by the permissions module 214.

An email inviter 236 is, in one example embodiment, a messaging subcomponent of the presentation server 102, and enables the presentation server 102, on behalf of a particular presenter, to send an email invitation to a viewer to asynchronously view a particular presentation 106. The email invitation includes a URL, described above as being created by the access control module 234, that is uniquely associated with a particular presentation and a recipient of the email.

Figure 3:
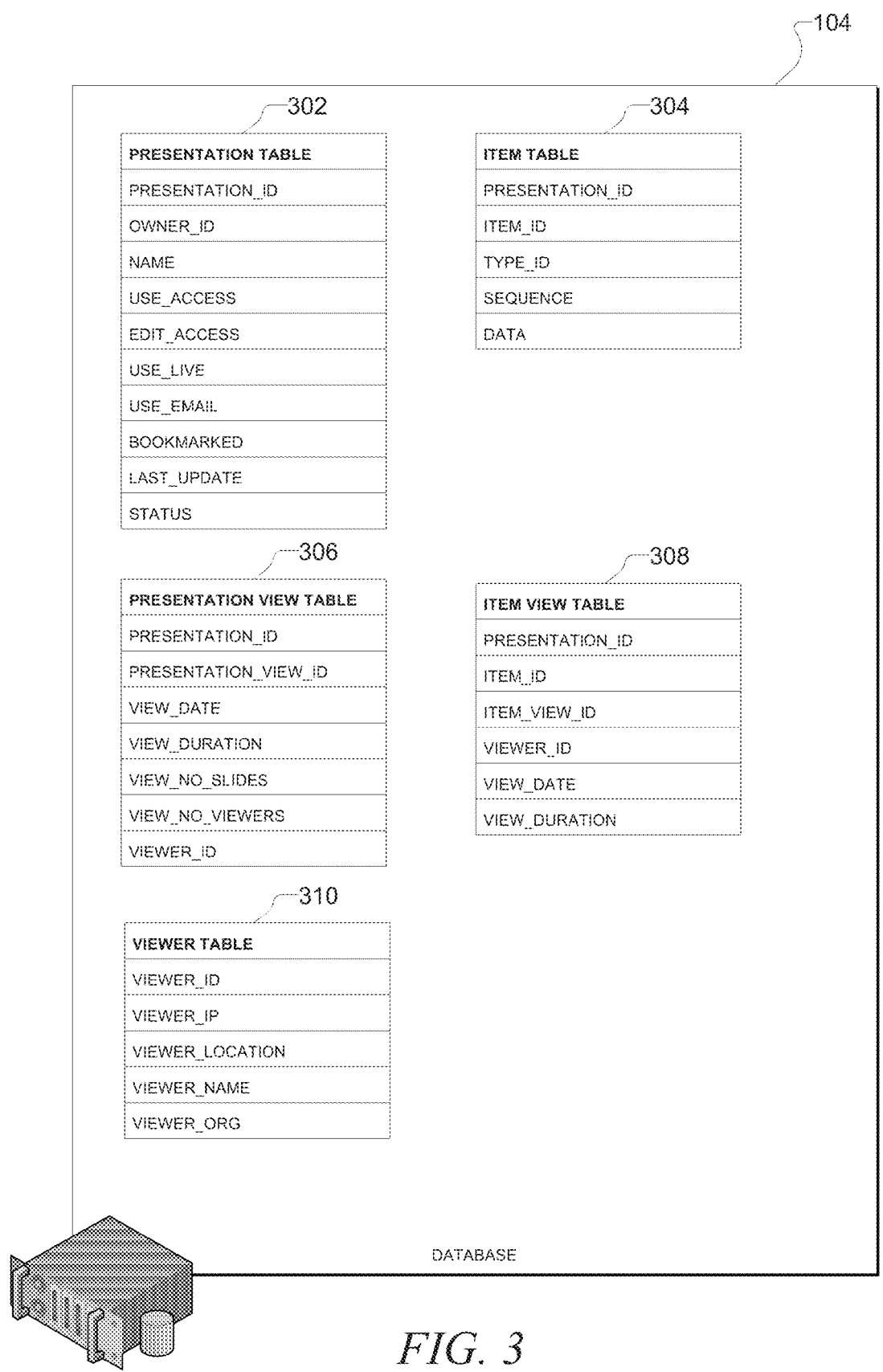
FIG. 3 is a diagrammatic representation of tables, according to some example embodiments, which may be maintained within a database accessible by the presentation server of FIG. 2.

FIG. 3 is a diagrammatic representation of a collection of tables, according to some example embodiments, which may be maintained within the database 104, so as to be accessible to the presentation server 102. In one example embodiment, the presentations 106 which are described in FIG. 1 as being stored within the database 104 may be stored as tabular data as shown in FIG. 3. It will of course be appreciated that the presentations 106 could also be stored in many other types of data structures and arrangements.

The collection of tables may include:
- a presentation table 302, which maintains information applicable to a presentation as a whole;
- a presentation item table 304, which maintains information specific to particular presentation items of a presentation;
- a presentation view table 306, which stores data pertaining to accesses (e.g., views or displays) of particular presentations;
- an item view table 308, which maintains access history data pertaining to accesses (e.g., views or displays) of presentation items that may constitute a presentation; and
- a viewer table 310, which maintains information pertaining to a particular viewer that has viewed, or has been invited to view, a presentation.

The presentation table 302 maintains one or more of the following data items for each presentation:
Presentation identifier: a unique identifier associated with each presentation that constitutes one or more presentation items.

Owner identifier: one or more identifiers for an owner or owners of a particular presentation.

Name: a name of the presentation.

Use access permissions: permissions identifying which presenters or owners are able to access, present or distribute the presentation to viewers.

Edit access permissions: identifies for presenters or owners who have edit privileges with respect to the presentation.

Use live permissions: a permission indication as to whether the presentation may be used in a 'five' synchronous presentation.

Use email permissions: a permission indication as to whether the presentation may be used in an 'emailed' asynchronous presentation.

Bookmarked: an indication of whether the relevant presentation has been bookmarked by a particular presenter or owner.

Last updated: date and time information indicator when the presentation was last updated.

Status: a status indicator identifying whether the presentation is valid or invalid.

The item table 304 maintains one or more of the following data items for each presentation item which may be included in a sequence of presentation items that constitute presentation:

Presentation identifier: the identifiers for one or more presentations within which the respective presentation item is included. It should be noted that a particular presentation item may be included in more than one presentation, but that a single instance of the relevant presentation item may be maintained within the item table 304.

Item identifier: a unique identifier for the presentation item.

Type identifier: an identifier indicating the type of content that the presentation item itself constitutes, or with which it is associated (e.g., from which it was derived or which it was represented). Example values here may include a file type (e.g., PowerPoint, Keynote, zip file, PDF, Word, Excel etc.), or a more generic media type (e.g., document, image, video, audio etc.), or a combination of media type and file type. In addition, the item type identifier may identify the presentation item as being a 'live' or screen sharing presentation item. In one example embodiment, a 'live' presentation may contain a URL (or other location identifier) that directs the browser executing on a viewer computer system 108, to a specific website so as to allow the actual website to be presented to a viewer in the course of a presentation. In the case of a 'screen sharing' presentation item, the presentation item may direct the browser executing on the viewer computer system 108 to a location at which captured images of a screen of a presenter computer system 112 are available for upload to the viewer computer system 108 and presentation to a viewer. A further discussion of the screen sharing that is enabled by the presentation server 102 is provided with reference to subsequent figures.

Sequence: a sequence identifier may, in one example embodiment, identify a sequence for the relevant presentation identifier within a sequence of presentation items that constitute a presentation. To this end, the sequence identifier may include item identifiers for both a preceding and a proceeding presentation item in a particular sequence. This allows the sequencer 222 of the presentation output module 216 to identify the ordering or sequencing which a set of presentation items, which constitute a particular presentation, should be presented to a viewer computer system.

Data: each presentation item includes data that represents content that may be presented to a viewer computer system (e.g., an image, audio or video data), or a location identifier (e.g., a URL) from which screen sharing data is retrieved, or which points to a website or application that forms part of the presentation.

The presentation view table 306 contains a number of data items that are populated with values by the tracker module 232. These data items, in one example embodiment, constitute access history data that reflects historical access (e.g., presentation and display) with respect to a presentation. Example data items that may be stored within the presentation view table 306 included:

Presentation identifier;

Presentation view identifier: a view identifier that uniquely identifies a session during which the relevant presentation (identified by a presentation identifier) was accessed and presented to one or more viewer computer systems 108.

View date: date and time information at which the presentation was presented for viewing to a viewer computer system 108.

View duration: time duration for the presentation.

View number of slides: the number of slides or other presentation items that were accessed and viewed during the presentation.

View number of viewers: a numerical indication of the number of unique viewer computer systems 108 that participated in viewing the presentation during a particular session.

Viewer identifier: viewer identifiers that identify each of the unique viewer computer systems 108 that accessed and viewed the relevant presentation during the presentation session.

The item view table 308 similarly records data regarding access to, and presentation of, individual presentation items that constitute one or more presentations. The item view table 308 may include the following example data items:

Presentation identifier;

Item identifier;

Item view identifier: an identifier uniquely identifying a particular instance of an access (e.g. viewing or display) of the relevant item;

Viewer identifier: identifying the viewer that viewed the presentation item during the particular instance of access;

View date;

View duration.

The viewer table 310 stores information regarding unique viewer computer systems 108 that are recognized as accessing one or more presentations 106 via the presentation server 102. To this end, the viewer table 315, in some example embodiments, may embody the following data:

Viewer identifier: a unique identifier for each entered, registered or detected viewer.

Viewer IP address: a determined IP address for each viewer computer system 108.

Viewer location: an estimated geographic location for a viewer computer system 108, as may be determined by the geolocation module 230.

Viewer name: a presenter, using a presenter computer system 112, may provide viewer identification information identifying a viewer (e.g., a viewer name, email etc.) to the presentation server 102, so as to enable the access control module 234 to create an access credential (e.g., a URL that is linked to this viewer identification information). This viewer identification information may be used to populate viewer name and viewer company fields within the viewer table 310, as well as other viewer identification information fields that may be included within the viewer table 310.

Figure 4:
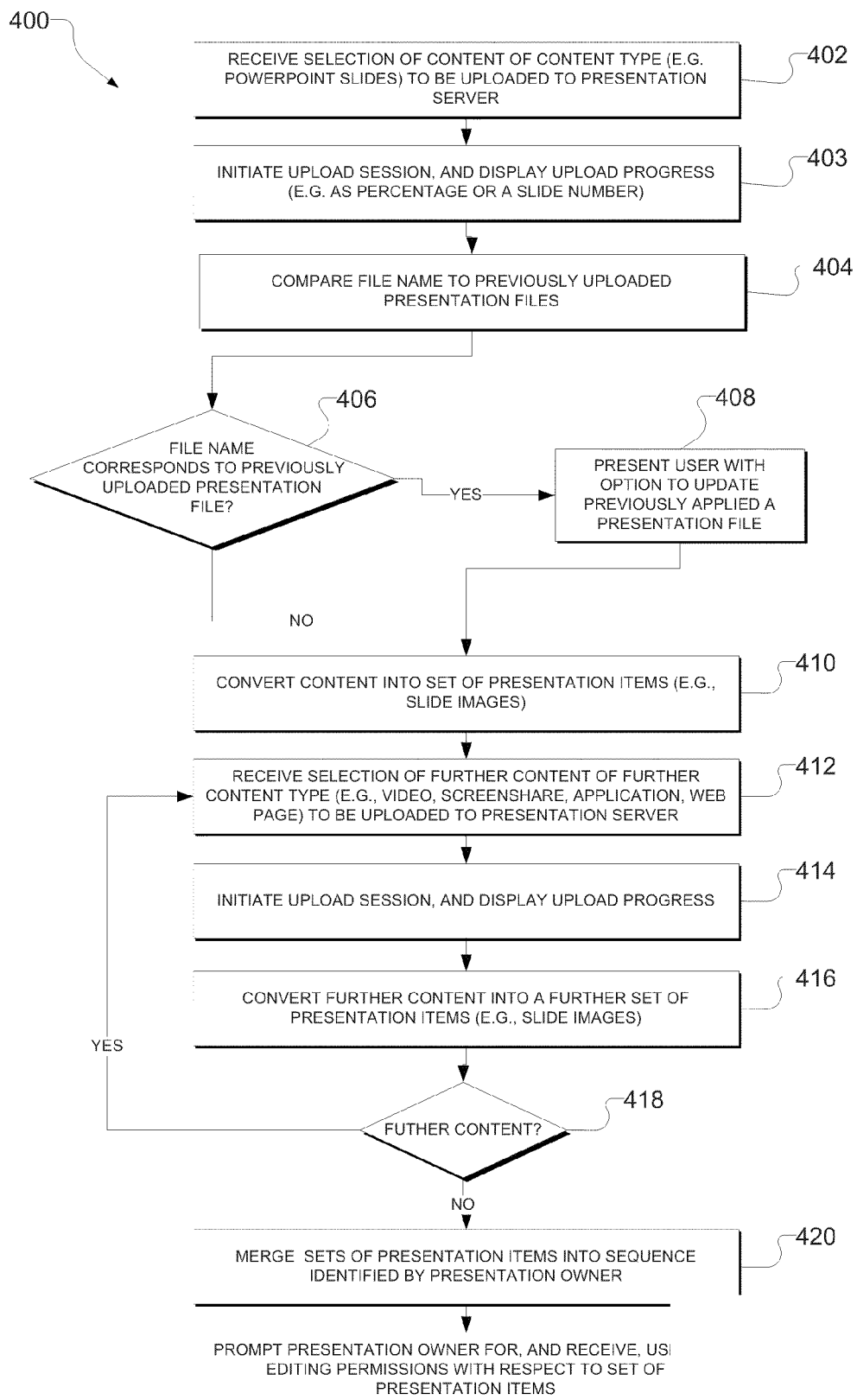
FIG. 4 is a flowchart illustrating a method, according to an example embodiment, to upload a presentation file to a presentation server.

FIG. 4 is a flowchart illustrating a method 400, according to an example embodiment, to upload presentation files (and other content) to the presentation server 102, and to process the uploaded presentation file to generate one or more presentations, each of which constitutes a sequence of presentation items to be presented from the presentation server 102 to a viewer computer system 108. The operations of the method 400 are, in the example embodiment, performed by the presentation server 102. However, in different example embodiments, some of the operations may be performed by other systems, for example in a distributed or real time computing implementation.

At operations 402 and 403, a user uploads a presentation file to the presentation server 102. The presentation server 102, and specifically the upload interface 202 receives a selection of content of a first content type to be uploaded to the presentation server 102. The presentation file may be, for example, any standardized presentation file format (e.g., PowerPoint), or an archive file containing a set of numbered images. The presentation server 102, at operation 403, initiates an upload session to upload the selected content. The content uploaded at operation 403 may also be video or audio content. While the content that comprises the presentation file is uploading, the presentation server 102, via an appropriate component of the presenter interface 201, may display progress of the update to a presenter, including what percentage of the presentation files has been uploaded, or a slide number that is currently being processed.

At operation 404, the upload interface 202 compares the filename of the uploaded presentation file to those of previously uploaded presentation files by the same presenter, or team of presenters. If the filenames match, the upload interface 202 may present the options of updating the previously uploaded presentation file with the newly uploaded presentation file, replacing the previously uploaded presentation file with the new presentation file, or storing the newly uploaded presentation file as a separate and distinct presentation file, as reflected at decision box 406 and operation 408.

At operation 410, the content generation module 204 of the presentation server 102 proceeds to generate a first set of presentation items, based on the uploaded content. In one example embodiment, the content generation module 204 converts the uploaded presentation file into a set of slide images. The generation of presentation items at operation 410 is dependent upon the type and nature of the content uploaded in the preceding operations. For example, where the content comprises at presentation file, such as POWERPOINT slide deck, a corresponding set of slide images may be generated at operation 410. Similarly, where the uploaded content is a WORD document or a PDF document, images corresponding to each page of such documents maybe generated at operation 410. Where the uploaded content is a simple image, such as a JPEG image, the conversion operation 410 may simply involve resizing or otherwise formatting the JPEG image for inclusions within a set of presentation items. Where the uploaded content is a video image, a presentation item corresponding to one or more frames of the video may be created as a representative presentation item that may be presented and selected by a viewer to invoke playback of the video file from the presentation server 102. Similarly, for audio data, a visual presentation item may be generated to represent the underlying audio data, and this visual presentation item may then be made available for inclusion within a set of presentation items that constitute a presentation.

The content that is uploaded in the preceding operations may, in some embodiments, also include an identifier for remotely stored content, such as a webpage application, or a video or audio data. For example, the content that is converted at operation 410 may be a URL that points to a particular webpage. The presentation server 102 may capture an image of a webpage to which the URL points, and store that image as a representative presentation item that represents a redirect of a presentation session to the actual underlying webpage. Similarly, where the uploaded content is a URL that points to a remotely stored video file or audio file, an image or representative of the destination of the URL may be captured, and a visual placeholder presentation item, representative of the underlying actual content, may be generated at operation 410.

The selected content received at operation 402 may, in some example embodiments, also comprise a screen share indication. For example, a presenter may indicate that he/she wishes to create a presentation item that incorporates screen sharing, either from the presenter computer system 112 or from some other remote computer system. In this case, the presentation item that is generated to correspond to the 'screen sharing' content may be a placeholder presentation item that identifies a screen screening presentation component. The placeholder presentation item may, during presentation, invoke a screen sharing session that is supported by the presentation server 102, as will be described with reference to other drawings.

A wide variety of content types for inclusion in a presentation 106 may be identified to the presentation server 102 at operations 401-410, and presentation items, corresponding to the identified content may be generated at operation 410. Where the identified content comprises discrete content items (e.g., slides of a PowerPoint presentation), a corresponding set of presentation items may be generated at operation 410. However, where the identified content comprises a single content item (e.g., an audio file, video file, website, etc.), a single placeholder presentation item, which is associated with a larger body of underlying content, may be generated. The underlying content may then be invoked, viewed or otherwise presented when the placeholder presentation item becomes a 'current' presentation item during the course of a presentation session.

At operations 412-416, the presenter may then select and upload second content, potentially of a second content type, from a presenter computer system 112 (or in fact from a further computer system accessible to the presentation server 102 via the network 110) to the presentation server 102. As with the first content, the second content may, at operation 416, be converted into one or more presentation items, either to be presented directly to a viewer, or to serve as a placeholder for the delivery of underlying content. Accordingly, subsequent to operation 416, the presentation server 102, and specifically the content generation module 204, has generated one or more sets of presentation items based on first and second content of different content types.

At decision box 418, the presenter may elect to optionally upload even further content items that may or may not be of the same content type as the previously uploaded content period. Where the presenter elects to upload further content, the method 400 iterates through operations 412-416.

Where the presenter elects not to upload a further content, the method 400 progresses from decision block 418 to operation 420. The presenter is provided with access to the presentation editing module 206 so as to enable the inclusion of presentation items, selected from multiple sets of presentation items and potentially representing underlying content of different content types, into a single sequence of presentation items. To this end, the presentation editing module 206 provides functionality to the presenter user to select one or more presentation items from previously generated sets of presentation items, for inclusion within a new sequence.

The various upload operations described above need not occur during a contemporaneous session. For example, the sets of presentations from which a presenter may select presentation items may be retrieved from the database 104. Accordingly, a presenter may elect to compose a new presentation from one or more newly uploaded sets of presentation items, from a combination of newly uploaded and previously stored presentation items, or solely from a previously uploaded presentation.

The process of authoring a new sequence at operation 420 may also include the performance of other editing operations, supported by the presentation editing module 206. For example, a presenter, given suitable edit permissions, may delete or temporarily hide a specific presentation item, may add or replace a specific presentation item with another, or may copy a presentation item from another presentation into the newly created sequence. Furthermore, the presentation output module 216, via a suitable presenter interface 201, allows the presenter to reorder presentation items by dragging-and-dropping the presentation items in order to establish a new ordering or sequence.

At operation 422, the presentation editing module 206 may prompt a presenter for use and editing permissions to be applied with respect to the newly created presentation. For example, the presenter may grant a certain group of presenters (e.g., employees of a particular department) with use permissions, in terms of which they are authorized to distribute and present the relevant presentation. A further set of presenters (e.g., a more select, senior group within the organization) may also be presented with editing permissions which authorizes editing of the presentation.

Figure 5:
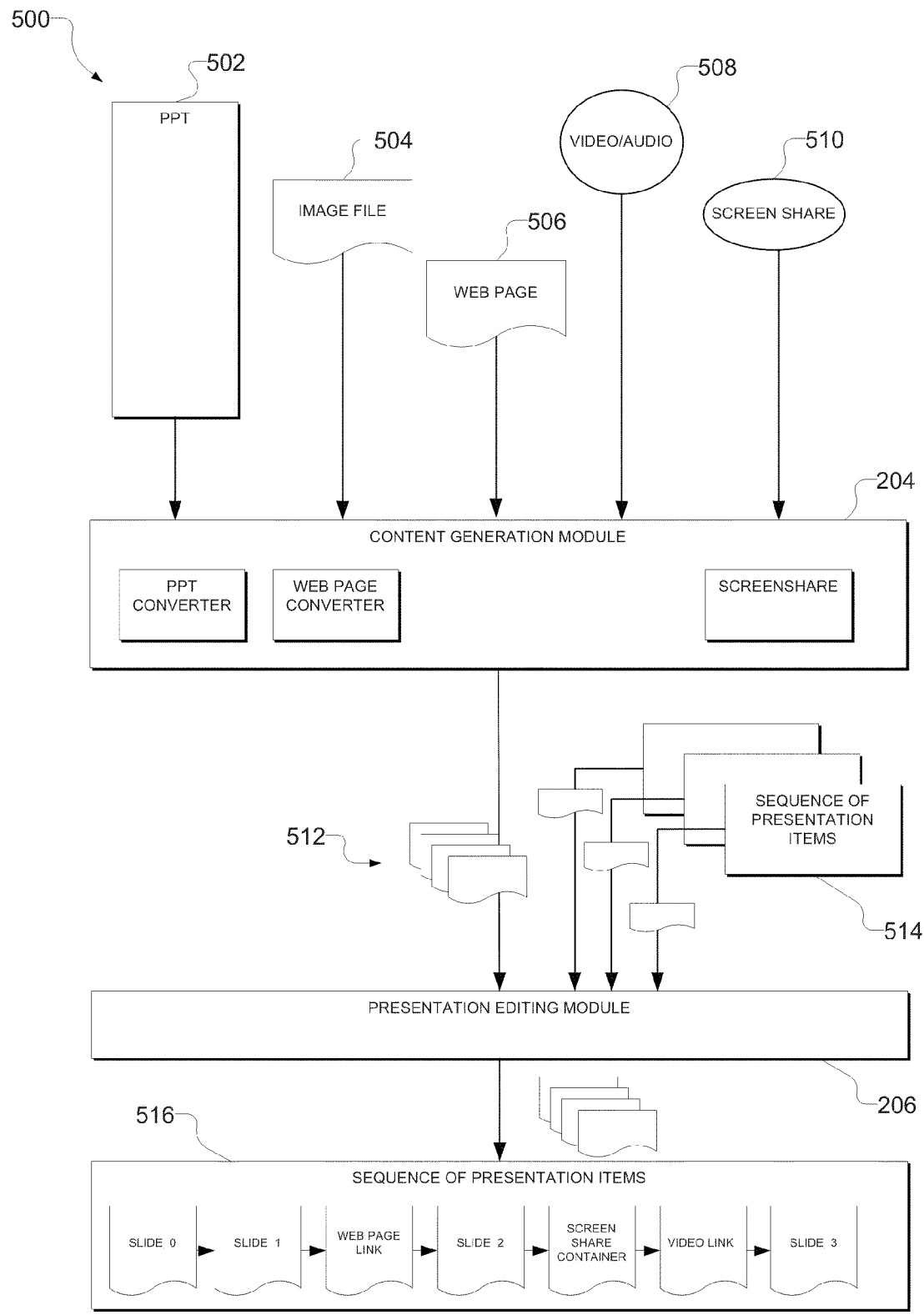
FIG. 5 is a block diagram illustrating a process, according to an example embodiment, to generate a presentation, compromising a sequence of presentation items.

FIG. 5 is a diagrammatic representation of the conversion processes discussed above with reference to FIG. 4, according to some example embodiments. The content generation module 204 is shown to receive a variety of different types of content, such as a POWERPOINT file 502, an image file 504, a web page 506, video/audio files 508 and a screen share identifier 510. In the case of webpage 506 and video/audio files 508, as opposed to receiving the actual content files, the content generation module 204 may receive location identifiers (e.g., URLs) that identify a remote location at which the relevant content is stored, and from where it may be transmitted.

The content generation module 204 is shown to include a number of converters that correspond to the different content types, and to output a set of presentation items (e.g., presentation images) 512 to the presentation editing module 206. Previously stored sequences of presentation items 514 may furthermore be retrieved by the presentation editing module 206 from the database 104, and made available within the context of the presentation editing module 206. A user may then create one or more new sequences of presentation items 516. The presentation items included in the sequence, as shown in FIG. 5, may be associated with, or be represented above, a content of a variety of different content types.

Figure 6:
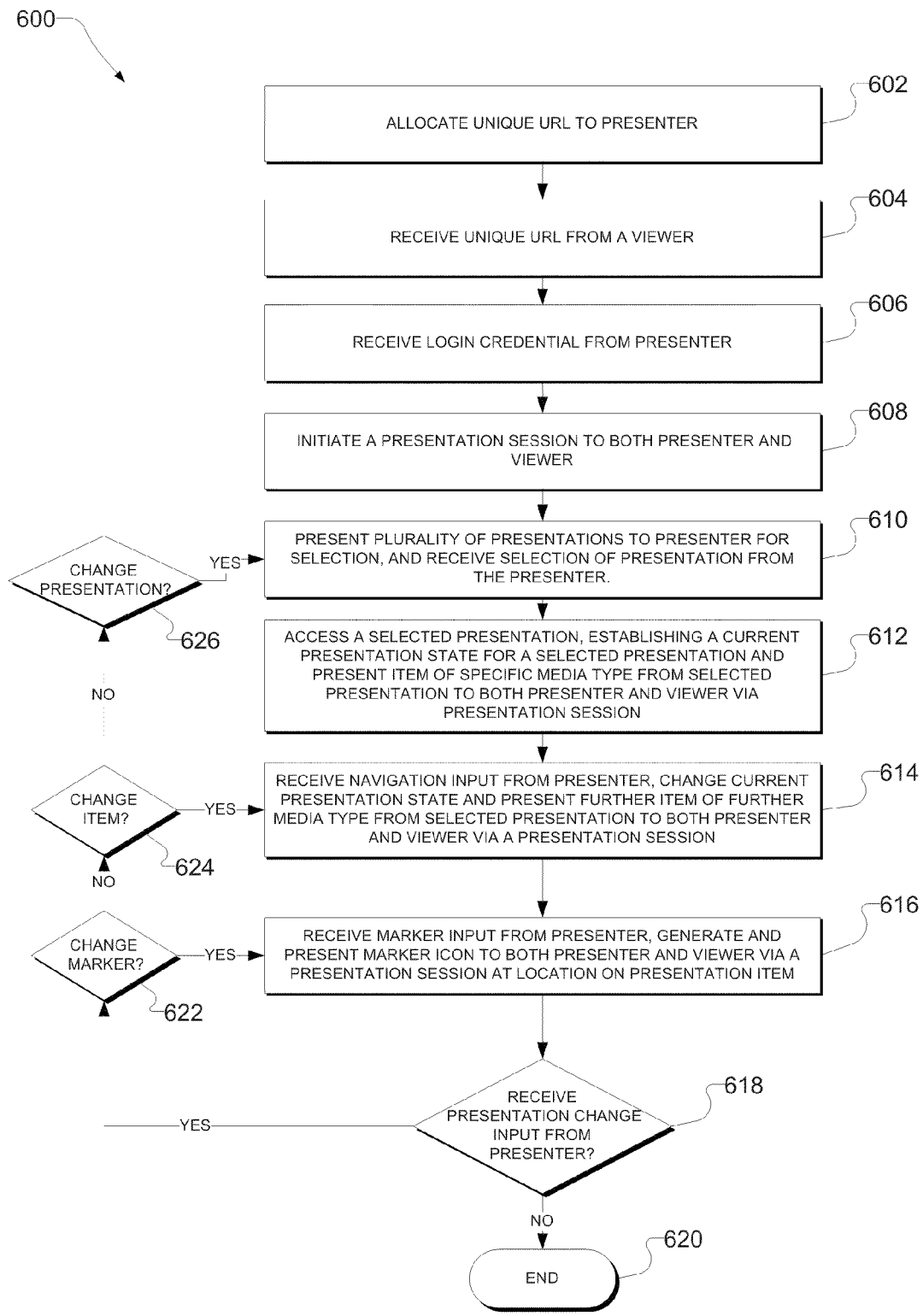
FIG. 6 is a flowchart illustrating a method, according to an example embodiment, to enable a synchronous presentation to a viewer computer system.

FIG. 6 is a flowchart illustrating a method 600, according to an example embodiment, to facilitate a synchronous (e.g., live) presentation of a presentation 106 to a viewer computer system 108, using the presentation server 102. While the flowchart illustrates the method 600 as having a number of operations performed in a sequence, it will be appreciated that a number of these operations may not necessarily be performed in the order shown in FIG. 6 and may be performed according to another ordering in other embodiments.

At operation 602, a presentation server 102 may allocate a unique URL to a particular presenter. For example, the URL may have the form 'domainname.com/name' or 'domainname.com/token', and uniquely identify a presenter (e.g., 'domainname.com/peter'), or uniquely identify a presenter/viewer combination. This allocation of the unique URL may occur during a registration process of the presenter with the presenter server. The unique URL may be dynamically generated, at the request of a presenter, prior to the presenter initiating a presentation session.

The presenter then communicates the unique presenter URL to a viewer accessing a viewer computer system 108. This communication of the unique presenter URL may be via the presentation server 102, or may be through some other channel (e.g., telephone call, email, message service, etc.). At operation 604, the presenter URL associated with the presenter is received from a viewer computer system 108 via a viewer interface 200. The receipt of the presenter URL constitutes an example of a request to access a presentation. Responsive to receipt of the presenter URL, the presentation server 102, as described in further detail with reference to FIG. 9, transmits a script (e.g., JavaScript) to the viewer computer system 108 for execution within the context of a browser hosted on the viewer computer system 108. The script operatively requests updated information in order to update a presentation display that is presented within the context of the viewer's browser.

The presentation display presented in the viewer's browser is selected and controlled by input received from the presenter computer system 112. As described elsewhere, a presenter, using the presenter computer system 112, may select particular content (either a stored at or accessible by the presentation server 102) for inclusion in the presentation display on the viewer's browser. The viewer's browser, while accessing the presenter URL, displays content that is identified by input from the presenter computer system 112 (e.g., Input received from a presenter), and the presenter URL does not change during the course of the presentation. This is advantageous in that it enables a presenter to distribute a presenter URL to one or more viewers as a personalized "presentation venue", in which the presenter has control over what content is displayed when a viewer accesses the presenter URL.

At operation 606, the presentation server 102 receives a login credential, via a presenter interface 201, from a presenter accessing a presenter computer system 112. Responsive to receipt of the login credential, the presenter server may similarly communicate a script (e.g., JavaScript) for execution within the context of a browser hosted on the presenter computer system 112. At operation 608, the presentation server 102 establishes a presentation session with both the presenter computer system and the viewer computer system 108. The presenter may distribute his/her unique presenter URL to multiple viewer computer systems, in which case the presentation server 102 may receive multiple access requests at operation 604. In this case, at operation 608, multiple viewer computer systems 108 may be included within the established presentation session. Further details regarding the presentation session are discussed below with reference to FIG. 9.

At operation 610, the presentation output module 216, specifically the presentation selector 228, via the presenter interface 201, presents a number of presentations to the presenter for selection. The list of presentations that are presented may be a list of presentations 106 stored within the database 104, and for which the relevant presenter has user permissions as recorded in the presentation table 302. Furthermore the list of available presentations may be arranged via bookmarks, folders, ownership or other criteria. Further, at operation 610, selection of a particular presentation from the list of presentations is received from the presenter.

At operation 612, the presentation output module 216 retrieves the selected presentation 106 from the database 104, and loads the sequence of presentation items that constitute this later presentation into memory of the presentation server 102. The presentation server 102 furthermore establishes a current presentation state for the selected presentations, in which a current presentation item of the sequence of presentation items is presented from the presentation server 102 to both the presenter computer system 112 and the one or more viewer computer systems 108. An initial presentation state may select a first slide from a presentation, for example, as a current presentation item. The presentation to the viewer computer system 108 may be responsive to the viewer interface 200 receiving a request from the script, previously provided to the viewer computer system 108, to receive the current presentation item determined by the presentation state. Similarly, a script executing within the browser hosted on the presenter computer system 112 may issue a request for a background presentation item, and the appropriate data is communicated, from the presentation output module 216 via a presenter interface 201 to the presenter computer system 112.

At operation 614, the presentation output module receives navigation input, via the presenter interface 201, from the presenter computer system 112. The navigation input may, for example, be a request to advance the current state of the presentation to a next state in which a next presentation item in the sequence is presented. Responsive to receiving the navigation input, the presentation output module 216, and specifically the state module 223, changes the presentation state and selects a further current presentation item for a presentation to both the viewer computer system 108 and the presenter computer system 112.

At operation 616, the presentation server 102, and particularly the marker generator 226 of the output module 216, may receive marker input, via a presenter interface 201, from the presenter computer system 112. The marker input identifies a location on the current presentation item. Responsive to receipt of the input, the marker generator 226 generates and presents a marker icon that is overlaid on the current presentation item, at the location identified by the presenter, to both the presenter and viewer computer systems 112 and 108. This enables the presenter to highlight a specific area on a presentation item to which the presenter may be referring at a particular time. In a further example embodiment, viewers, via a viewer computer system 108, may also click on marker icons that are viewable to other viewers and to the presenter in order to move and locate these marker icons with respect to the current presentation item.

At decision block 618, a determination is made as to whether presentation change input has been received from a presenter. Responsive to a negative determination (e.g., when the presentation has ended), the method 600 then terminates at block 620.

On the other hand, should a presentation change input have been received from the presenter, the method 600 loops back to decision block 622 wherein a determination is made as to whether the change input was changed marker input. If so, the method 600 performs operation 616.

A determination may also be made at a decision operation 624 as to whether the change input is a presentation item change input (e.g., navigation input to advance to a next presentation item in a sequence). If so, the method 600 then performs operation 614.

A determination may also be made at decision block 626 as to whether the change input is a presentation change input indicating a request from the presenter to switch to a different presentation. If so, the method 600 loops back to operation 610, where the presenter is again presented with a list of presentations from which to select.

In some example embodiments, a presenter may also activate a 'secure mode' by choosing to require that a viewer input, via a viewer computer system 108, an access code to be presented with the current presentation item. This may be useful as the unique URL (e.g., allocated at operation 602) that the presenter distributes to viewers may be used repeatedly. By activating a 'secure mode' in which a viewer is required to input the access code, the presenter is able to exercise an additional degree of control over who is currently viewing a presentation. The access code may be a random code suggested by the system, or may be provided by the presenter. Once the access code is selected, all viewer computer systems 108 currently participating in a presentation session are returned to a welcome page, and the viewers are required to enter the access code before they may continue viewing the relevant presentation. The display of a presenter may be updated with a list of viewers that have been granted access, as well as a list of viewers currently participating in the session from which the access code has not been received.

The presentation items that are selected (based on current presentation state as a current presented item) may be content, or be associated with content, of different types. Where the presentation item, for example, is an image derived from a slide of a POWERPOINT presentation for example, this image may be directly presented to both the presenter and viewer computer systems 112 and 108. On the other hand, where the presentation item is associated with video content, this content may be retrieved (e.g., from the database 104 or from a remote location) and presented to both the presenter and the viewer computer systems 108. In the case of a video content, the presenter may, via a presenter interface 201, be provided with a various controls with which the presenter may stop and start the video. Further, the video may automatically start when the relevant presentation item associated with the video is displayed.

Where the presentation item embodies a location identifier (e.g., a URL), a webpage, for example, accessible via the URL, the web page is displayed on both the presenter computer system 112 and the viewer computer system 108 when the appropriate 'placehold' presentation item is selected as the current presentation item. In this example, the webpage may be presented in a framed browser page, or as a separate window. The presenter may then browse to a new page, submit web forms, and control other user interface elements, responsive to which the presentation server 102 updates a display presented to the viewer computer system 108 accordingly. The viewer may interact with the page directly, to browse to a new page, submit web forms, and control other user interface elements without the assistance or control of the presenter.

Further, the presentation server 102 may cause presentation items, other than the current presentation item, to be pre-loaded in browsers operating on the presenter and viewer computer systems 112 and 108, before these additional presentation items are displayed. To accomplish this, the presentation server 102 may transmit to the client interface data about the upcoming presentation items (such as a URL in the case of an image), which the client's JavaScript can then pre-load in the background, while it is displaying the current presentation item to the viewer. In this way, when a presenter advances to a next presentation item, the need to wait for the subsequent presentation item to be downloaded may be avoided.

Figure 7:
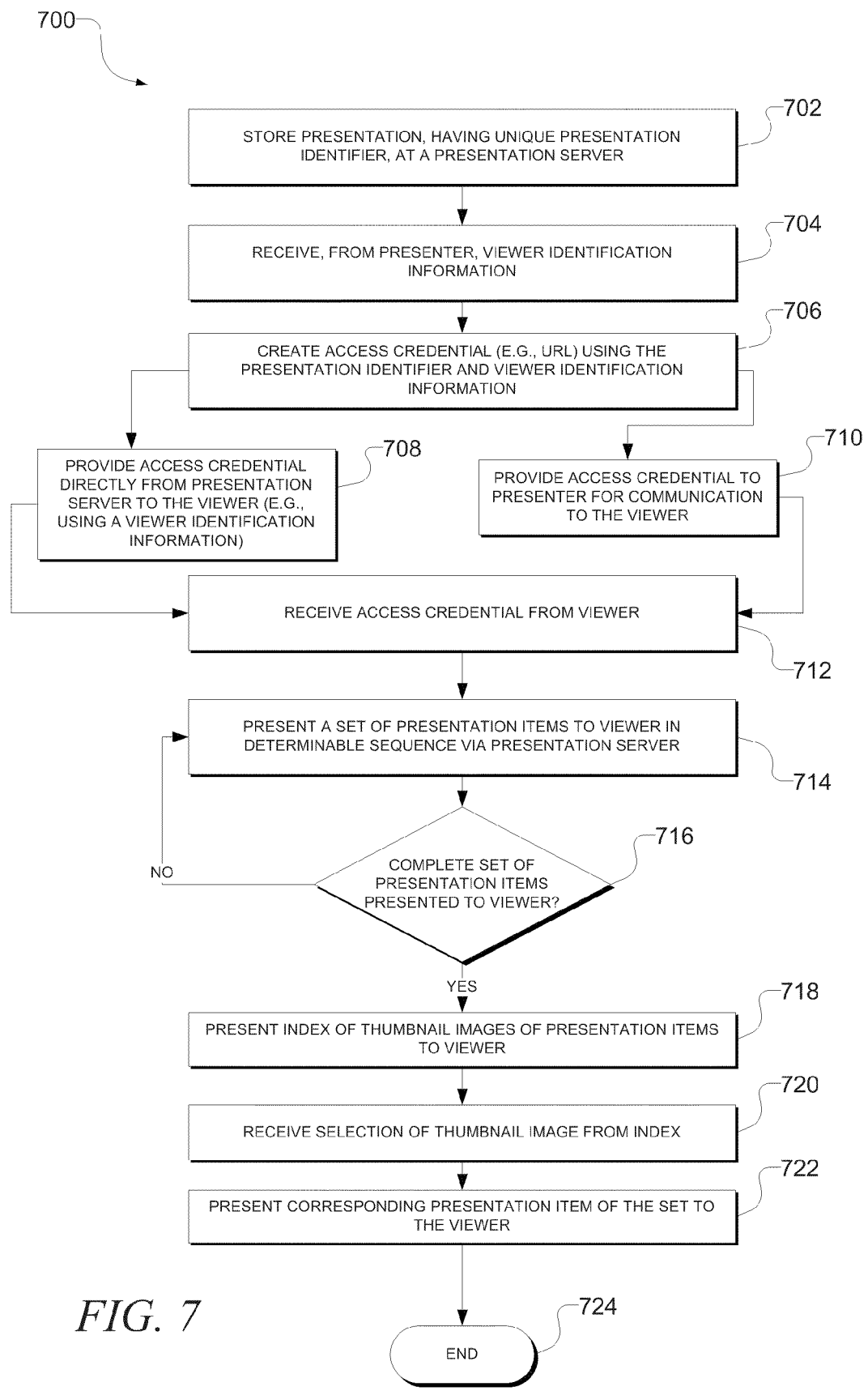
FIG. 7 is a flowchart illustrating a method, according to some example embodiments, to facilitate an asynchronous presentation to a viewer computer system.

FIG. 7 is a flowchart illustrating a method 700, according to some example embodiments, to facilitate an asynchronous presentation to a viewer computer system 108.

The method 700 commences with the storage of a presentation, 106, having a unique presentation identifier, in the database 104 that is accessible via the presentation server 102. The unique identifier, in one example embodiment, is the presentation identifier maintained within the presentation table 302. The presentation stored at operation 702 comprises a sequence of discrete presentation items that are of, or present, multiple content types. The presentation may, as described above with reference to FIG. 4, be uploaded from a presenter computer system 112.

At operation 704, viewer identification information is received at the presentation server 102, via a presenter interface 201 from the presenter computer system 112. The viewer identification information identifies a viewer to which the presentation is to be made accessible (e.g., displayed) by the presentation server 102. The viewer identification information may, for example, be the personal information or contact information (e.g., name, email address, employer etc.) of a viewer to be invited to access a presentation.

At operation 706, the presentation server 102, and in one example the access control module 234, creates an access credential to enable access to the presentation by a viewer computer system 108 via the presentation server 102. The access credential is created using both the presentation identifier of the presentation to be made accessible, and the viewer identification information received at operation 704, and the presenter. In one example embodiment, the access credential may be a URL that is unique to a particular presentation identifier—viewer identification—presenter identifier information combination. To this end, a record may be maintained within the database 104 associating or linking the URL to both the presentation identifier and the viewer identification information (e.g., stored in the presentation table 302 and the viewer table 310, respectively) and the presenter identifier. Continuing an example in which the access credential is URL, the URL may be made accessible to a viewer in two ways. For example, at operation 708, the URL may be provided directly from the presentation server 102 in an invitation email to a viewer via one of the viewer computer systems 108. Specifically, the email inviter 236, described above with reference to FIG. 2, may construct an invitation email that is sent to an email address included in the viewer identification information received at operation 704. Alternatively, or additionally, at operation 710 the presentation server 102 may make the URL available to a presenter for communication (e.g., in an email originating from a presenter computer system 112 or other methods like IM) to a viewer via an appropriate viewer computer system 108.

At operation 712, the access credential (e.g., the URL) previously communicated to the viewer is received at a viewer interface 200 of the presentation server 102. At operation 714, responsive to the receipt of the URL, the presentation output module 216 presents a set of presentation items to the relevant viewer computer system 108 in a determinable sequence. In this example, the presentation items may be presented only to the relevant viewer computer system 108, from which the URL was received, in a manner similar to that described above with reference to FIG. 4. However, in this embodiment, as opposed to presenting navigation controls to the presenter computer system 112, the navigation controls may be presented to the viewer computer system 108, so as to enable the viewer to navigate through the set of presentation items. In an alternative embodiment, as opposed to providing the viewer with navigation control, the set of presentation items may be presented as a slide show that automatically advances from one presentation item to the next. As with the synchronous presentation discussed above with reference to FIG. 4, the set of presentation items may themselves comprise, or be representative of, content of a variety of content types (e.g., images, video, audio, web pages, applications etc.).

At decision block 716, the presentation output module 216 determines whether the complete set of presentation items has been presented to the viewer computer system (e.g., indicating that the viewer has viewed the slides in a presentation at least one time). If not, the method may loop back to operation 714. If, on the other hand, a positive determination is made at decision block 716, the method 700 may advance to operation 718.

At operation 718, the presentation server 102 (e.g., a viewer interface) may present an index to the sequence of presentation items to the viewer computer system (e.g., in the form of a slide index, which shows thumbnail images and index numbers for each of the slides in the sequence of the relevant presentation). At operation 720, the viewer interface 200 may then receive selection of a particular thumbnail image from the index, responsive to which the sequencer 222 of the output module 216 may, at operation 722, present the presentation item, corresponding to the selected thumbnail image, to the viewer computer system 108. The method then terminates at operation 724.

In other embodiments, the index of thumbnail images corresponding to presentation items, as opposed to only being presented once all presentation items have been viewed, may be included in the navigation controls presented to the viewer computer system 108 at operation 714.

Figure 8:
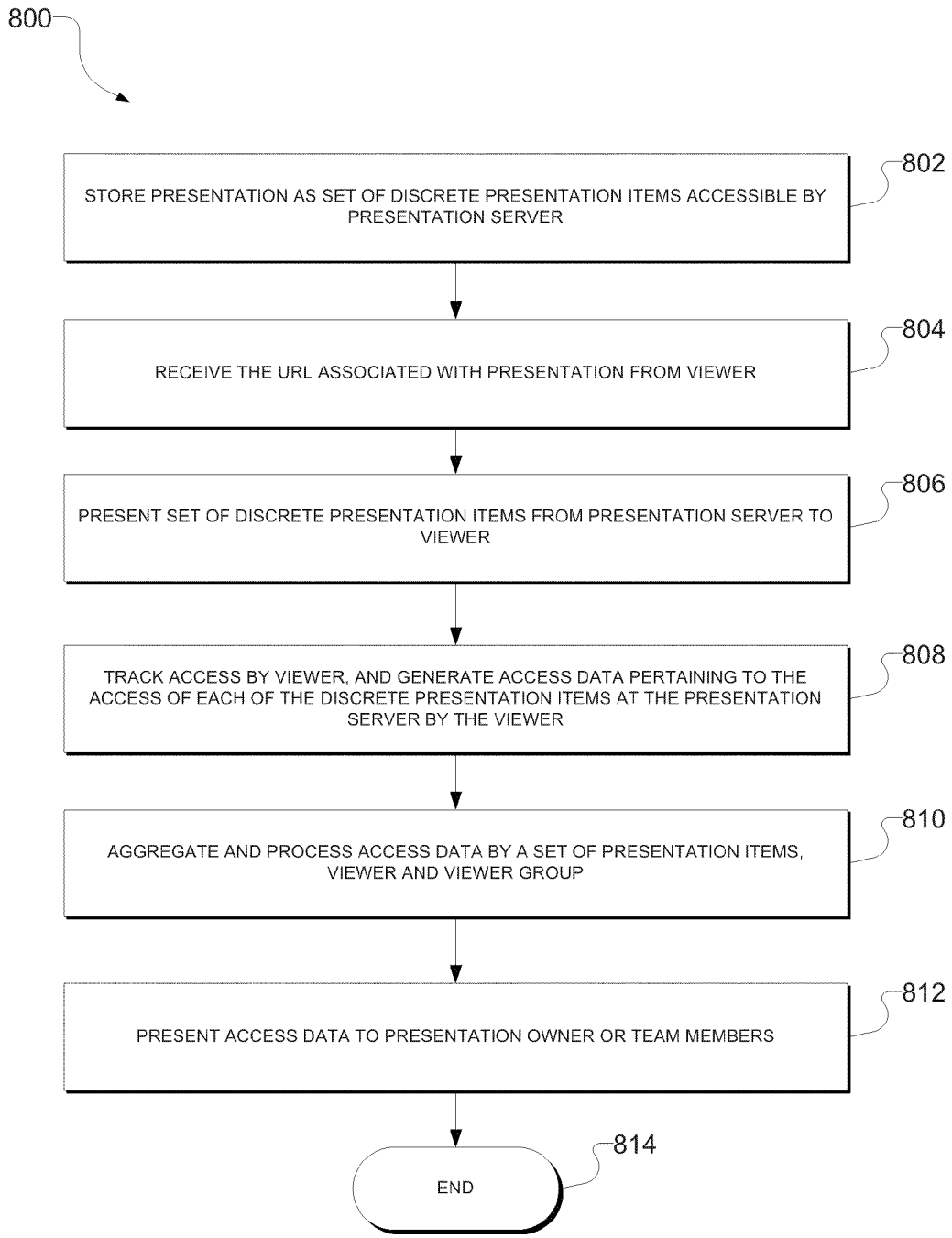
FIG. 8 is a flowchart illustrating a method, according to some example embodiments, to track and aggregate access history information for access to a presentation.

FIG. 8 is a flowchart illustrating a method 800, according to some example embodiments to track access activity and to generate and aggregate access history information relating to access activity with respect to a presentation via the presentation server 102. The method 800 commences at operation 802, with the storage of a presentation 106 in the database 104 accessible by the presentation server. As presented above, in some embodiments, the presentation may be stored as a set of discrete presentation items, associated with multiple content types, and as having been generated via the content generation module 204.

At operation 804, an access credential, in the example form of a URL that is associated with the presentation, is received via a viewer interface 200 from a viewer computer system 108. The URL may, in one example embodiment, be the access credential as discussed above with referenced to FIG. 7 but may, in another embodiment, be a URL that is only associated with the relevant viewer, and is thus useful to identify the viewer.

At operation 806, the presentation server 102 presents the set of discrete presentation items to the viewer computer system 108, as described above with reference to FIG. 7.

At operation 808, the tracker module 232 tracks access by the viewer to each discrete presentation item of the set. Specifically, the identity of the viewer is determinable by the tracker module 232 from the URL received at the presentation server at operation 804. In this way, the tracker module 232 is able to associate access information, with respect to each presentation item of the set, with a particular viewer.

At operation 810, the tracker module 232 may aggregate and process the access data, after which the processed and aggregated access data may be made available to a presentation owner, or team members of a presentation owner) at operation 812. The method then terminates at operation 814.

In a further example embodiment, as opposed to receiving a URL that is associated with a particular viewer at operation 804, the presentation server 102 may present a viewer with a registration screen into which the viewer is prompted to provide his/her name, email or other contact information prior to being granted access to the presentation. In some example embodiments, the registration form (or a registration field) may only be displayed for a second unique viewer (e.g., where an initial viewer has forwarded the URL to a further viewer). This is useful for assisting a presenter in understanding who has viewed a presentation, beyond an original viewer to which an email invitation may have been sent. In addition to requesting that a second (or further) viewer input their name, the further viewer may be prompted for other information such as company/organization, title, etc. In this case, the tracker module 232 may also interface with the geolocation module 230 to determine geolocation information associated with the further viewer.

A presenter, when configuring a presentation, may also configure the presentation server 102 to provide an alert when a viewer computer system 108 accesses a particular presentation, or enters a name into a registration form. Further, the presenter may configure the presentation server 102 to generate an alert to the presenter (or presentation owner) when a viewer computer system has accessed (e.g., viewed) a presentation for a set or determinable period of time. Such alerts may be sent to the presentation owner by email, SMS, Instant Message (IM) or other means. The alert may further include information identifying the presentation, original recipient, geographic location of the viewer computer system 108, which slides were viewed and for how long, when the relevant slides were viewed or accessed, the name or other identification information provided by a viewer, and a link to a webpage containing further historical access information.

In further embodiments, the tracker module 232 may collect access history information for both synchronous (e.g., live) and asynchronous (e.g., email inviter) presentations. The historical access information may be processed (e.g., for example at operation 810) to generate various statistics, including geographic locations of viewer computer systems 108, companies and organizations assessed to be associated with the viewers, which slides were viewed by which viewers, how long each slide was viewed, and total duration for which a viewer viewed slides in a set or sequence, and the number of presentations accessed by a particular viewer or group of viewers.

In the case of a synchronous (e.g., live) presentation, the tracker module 232 may further, via an appropriate presenter interface 201, prompt a presenter accessing a presenter computer system 112 to include certain information that the presenter may know regarding viewers of the presentation. This information may include, for example, the name of the company/organization to which the presentation was made, the name of the individual viewer if known, notes pertaining to the display, a category of the display, estimates of the value of the presentation opportunity, follow up suggestions, contact information and other Customer Relationship Management (CRM) information. In one embodiment, the tracker module 232 may access a separate CRM system (e.g., a SALESFORCE System) operated by an organization, and integrate this information with other CRM information maintained by that system. Regarding the presentation of historical access data at operation 812, the tracker module 232 may generate, and cause a presenter interface 201 to display various types and forms of statistics. The presentation server 102 may for example, display statistics according to a specific time range as chosen by a user, and may organize statistics by presenter or by presentation. Further, the presentation server 102 may display statistics in a chart that shows an aggregate of all statistics across a team of presenters (e.g., a sales team), may compare presenters or presentations, or may show only one presenter or presentation. The presentation server 102 may also display, list, or table summarizing synchronous and/or asynchronous displays, and may display detailed information for each synchronous or asynchronous display. This detailed information may include a list of all viewers, and a visual timeline showing when each slide was displayed and for how long (see FIG. 28). In this user interface, the user may mouse over each presentation item (e.g., slide) to view additional details like duration and a presentation image thumbnail. Further, the user may click on the timeline bar to view a full representation of the presentation item.

The presentation server 102 may also display statistics on a map, with a map icon representing a recently completed synchronous or asynchronous presentation. The icons may be colored by type of display (e.g., synchronous v. asynchronous) or by presenter or presentation. Further, the presentation server 102 may output a display that groups multiple map icons in a small area into one larger icon. A user is then presented with the option to zoom into the view in which case the larger icon will be replaced by a view of the multiple smaller icons.

The presentation server 102 may also display a separate list of all notes entered by presenters, and may display a running list of recent activity. A recent activity may include, for example, new users who have recently registered with the presentation server, a recently completed synchronous (e.g., live) display, asynchronous presentations that were recently viewed, presentations that have been recently updated, created or posts entered by other users. Access to the statistics may also be selectively made available to presenters, groups of presenters or presentation owners, based on permissions.

Figure 9:
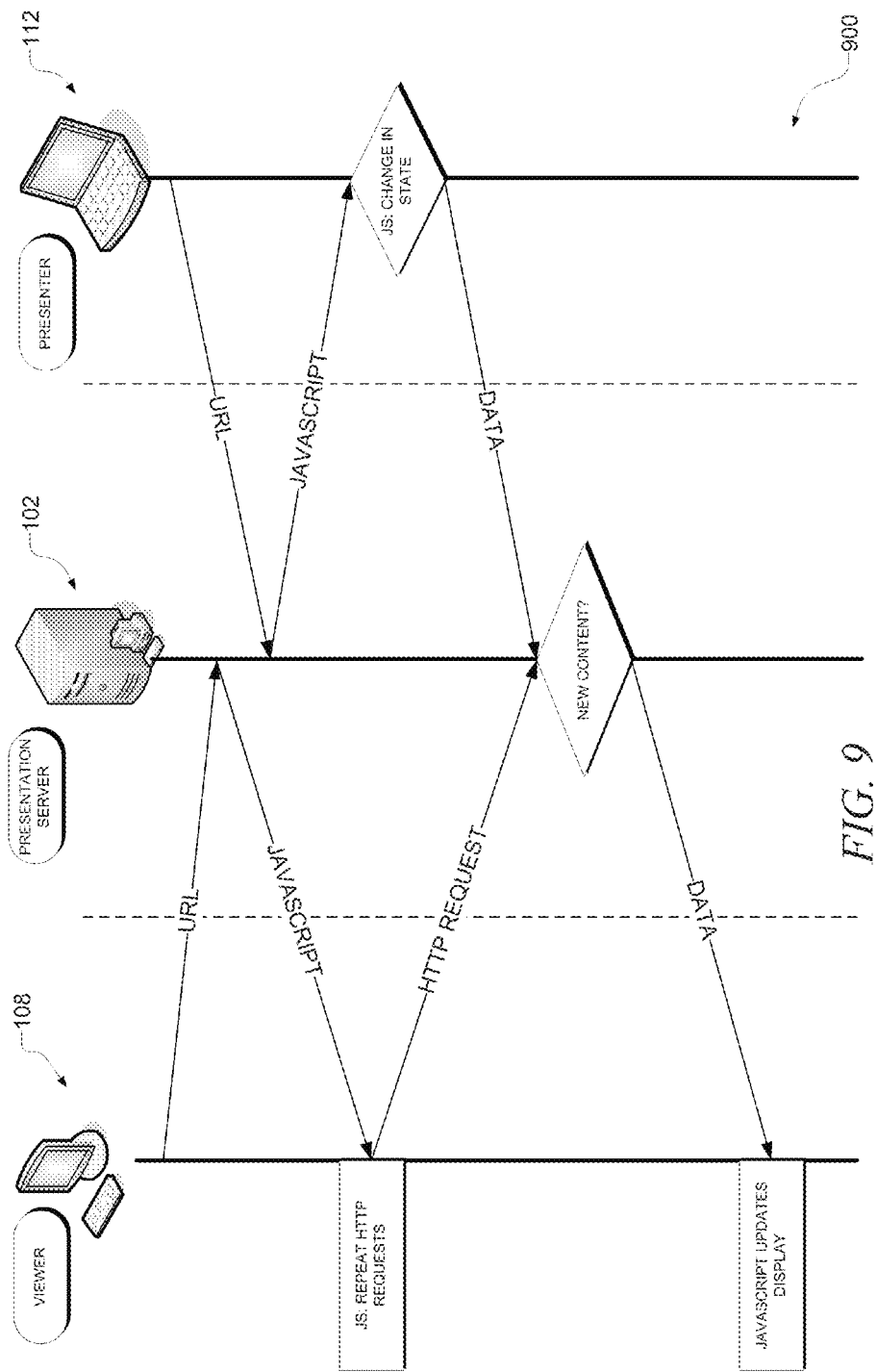
FIG. 9 is an interaction diagram illustrating a process, according to some example embodiments, to present content on a viewer computer system using a client-side script that communicates with a presentation server.

FIG. 9 is an interaction diagram illustrating a process 900, according to some example embodiments, to present content to a remote computer system (e.g., a viewer computer system 108 and a presenter computer system 112) using a client-side script that implements a request-response protocol with the presentation server 102. An example AJAX implementation is described with reference to FIG. 9. However, it will be appreciated that other request-response protocols may be used.

The process 900 commences with a URL being received at the presentation server 102 from a viewer computer system 108, the URL to access a presentation that is made available by the presentation server 102. Responsive to receipt of the URL, the presentation server 102 provides JavaScript code to the viewer computer system 108. The JavaScript code makes repeated HTTP requests through the presentation server 102 to assess whether new content is available at the presentation server 102 for display within the context of a browser executing on the viewer computer system 108. If a new content is available, the presentation server 102 responds with a data for the new content (e.g., a URL that points to a new image, webpage, video, live demonstration etc.). The JavaScript executing on the viewer computer system 108 then updates the display.

Similarly, with respect to a presenter computer system 112, responsive to a login to the presentation server 102, a JavaScript is downloaded to, and executes within, a browser environment of the presenter computer system 112. The JavaScript may execute to detect a change in presentation state by the presenter (e.g., using navigation controls that are implemented by the JavaScript). Responsive to detecting such a change in presentation state, the JavaScript updates the presentation server 102, which in turn updates the presentation state as maintained by the state module 223. The JavaScript on the presenter computer system 112 also makes repetitive update calls to the presentation server 102 to accommodate situations where the presenter has switched browsers or computers, or has opened multiple windows etc. The above example embodiment provides advantages over other solutions that require the download of an application, plug-in Java Applet or Flash object. Such software often creates a persistent TCP connection to a server, and have the server push new content to clients. While this model may provide some advantages in terms of network usage, it does require the installing of software on the remote computer system (e.g., either a viewer computer system or a presenter computer system). The installation of such software often presents a barrier to adoption of a solution.

Figure 10:
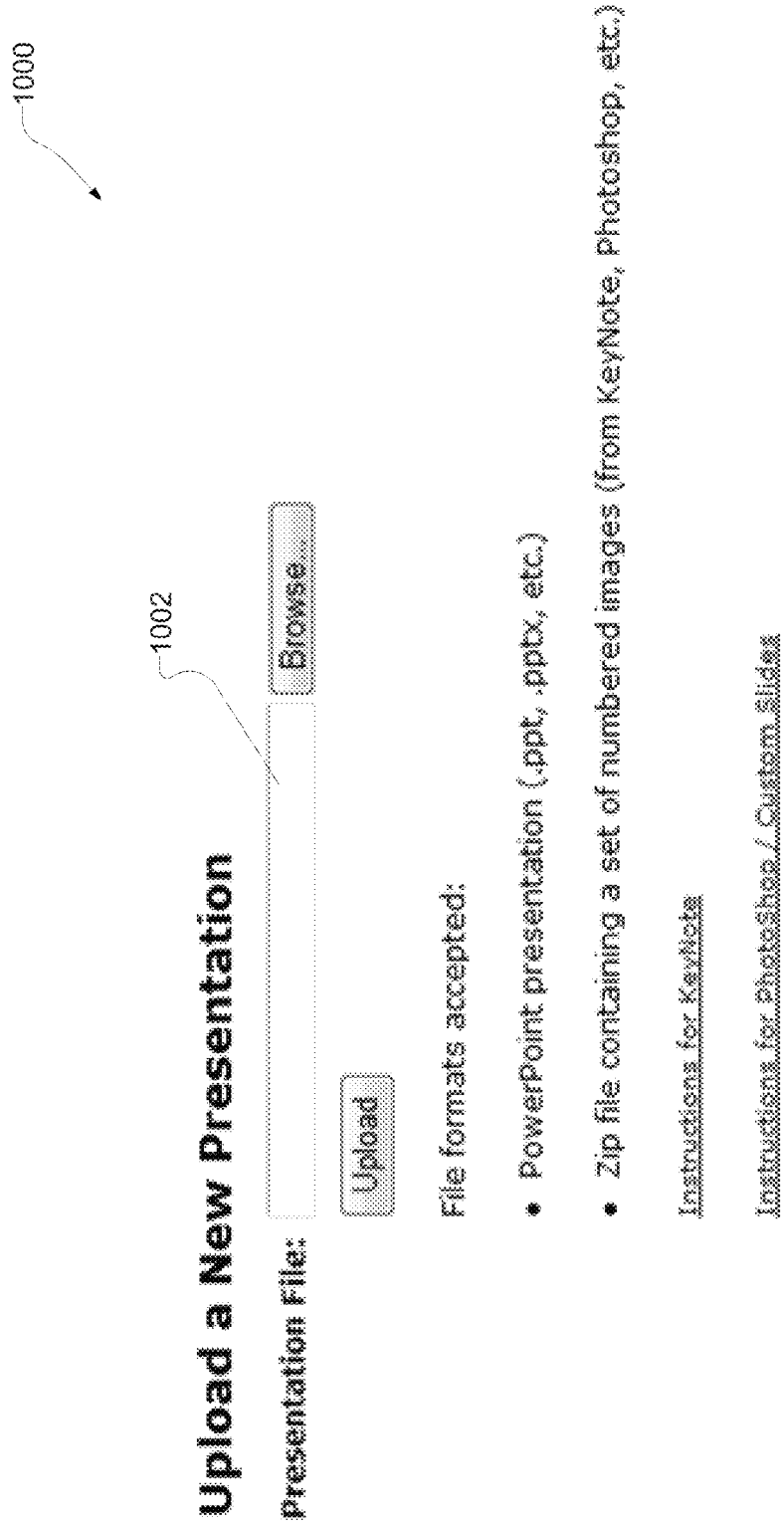
FIG. 10 is a screenshot of an interface, according to an example embodiment, by which a user may upload a presentation file to a presentation server.

FIG. 10 is a screenshot of a presentation upload interface 1000 that may be presented to a user by the presentation server 102 in the course of the upload method 400, as discussed above with reference to FIG. 4. As noted, the upload presentation interface 100 includes an input field 1002 into which a user may input a storage location from which the relevant presentation file may be retrieved for uploading.

Figure 11:
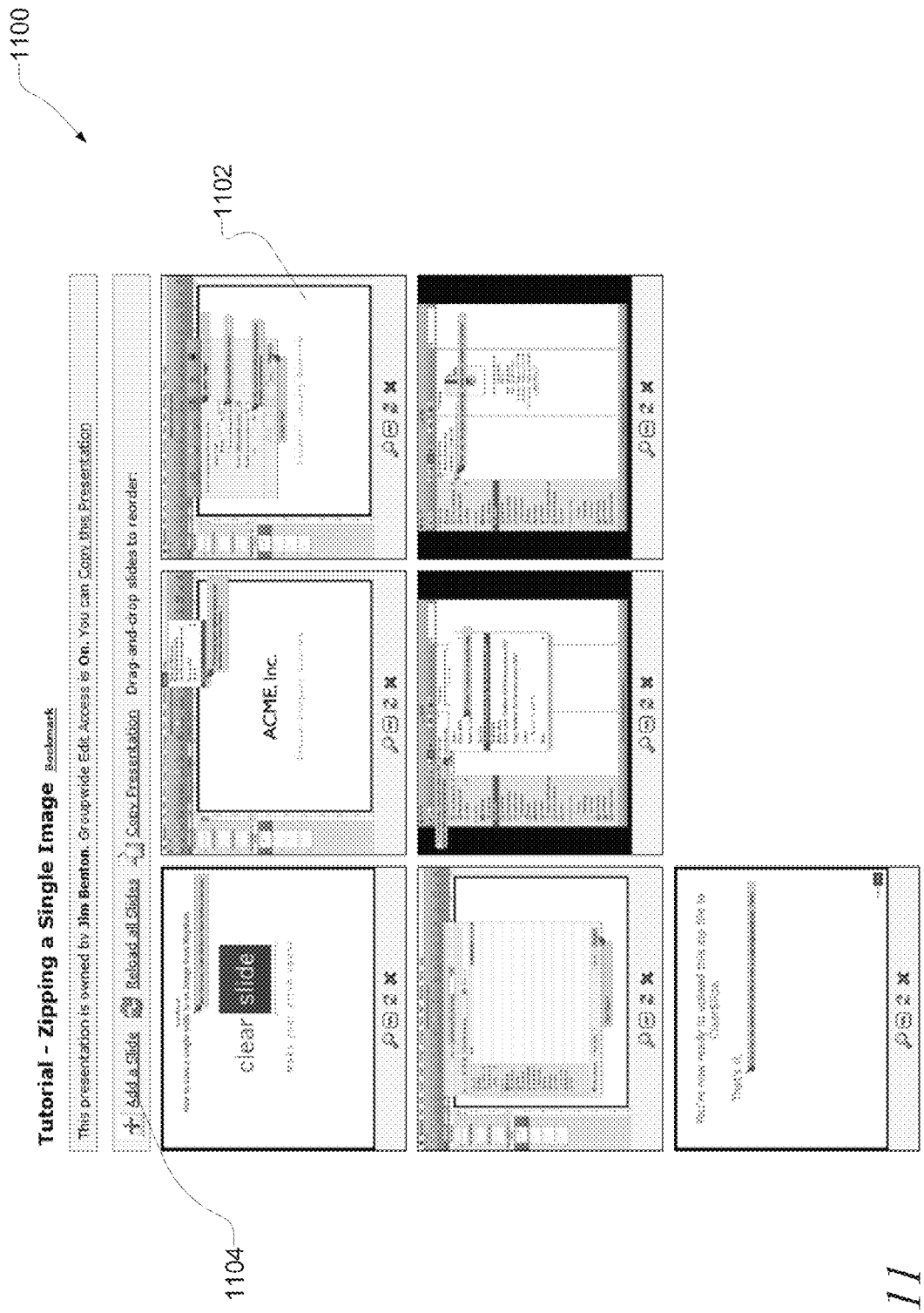
FIG. 11 is a screenshot of a presentation editing interface, according to some example embodiments.

FIG. 11 is a screenshot of a presentation editing interface 1100, according to an example embodiment. As noted, a collection of thumbnail images, corresponding to the presentation items that constitute a presentation, are presented. Using the presentation editing interface 1100, a user may drag-and-drop slides to reorder these slides. Further, an 'add a slide' button 1104 is user selectable in order to add a presentation item to the collection. Such an additional slide may be obtained from, for example, other presentations that are accessible at the presentation server 102, or may be uploaded from a remote location (e.g., a presenter computer system 112, or another location accessible via the network 110 by the presentation server 102).

Figure 12:
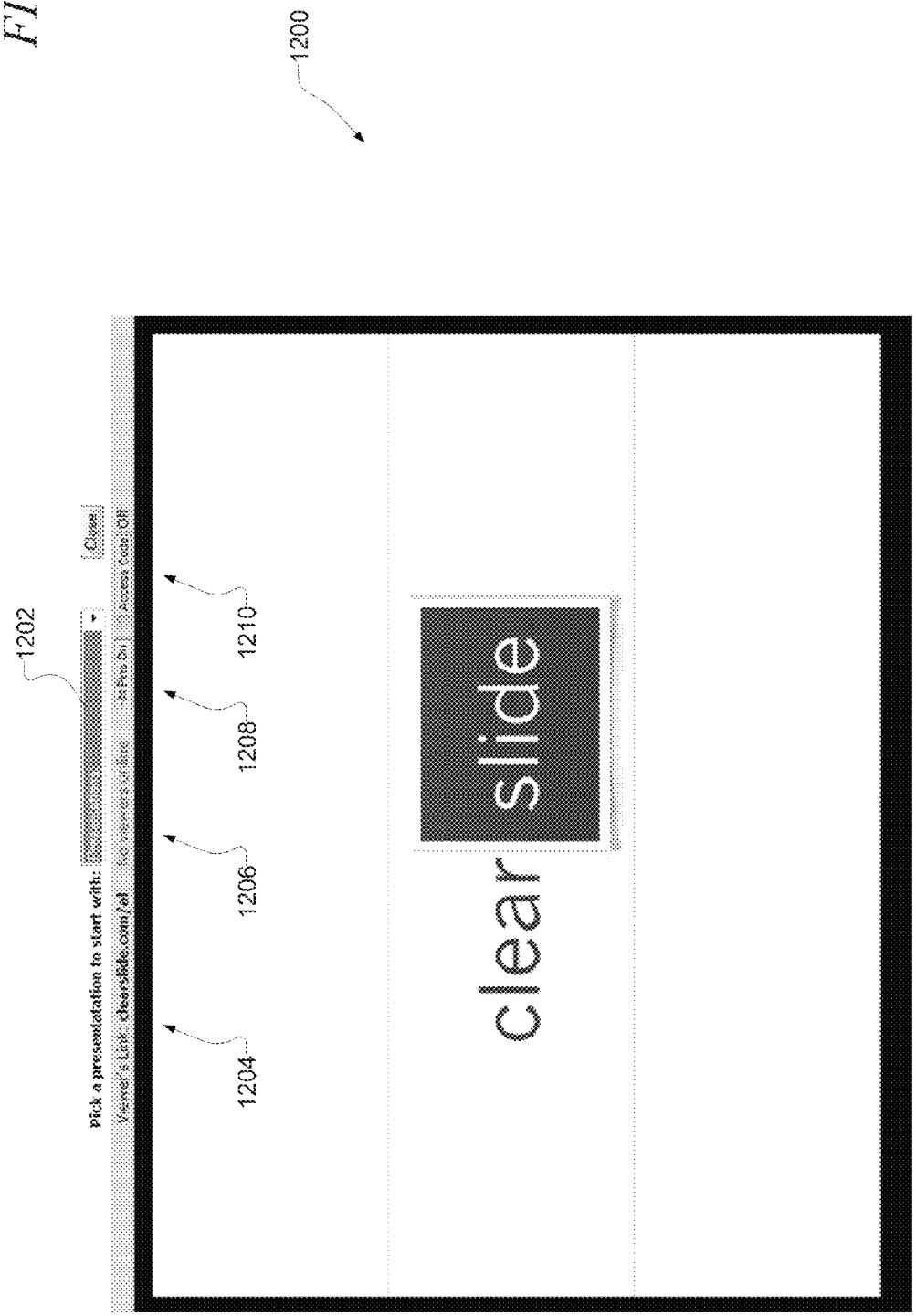
FIG. 12 is a screenshot of a live display interface, according to some example embodiments.

FIG. 12 is a screenshot of an example live display interface 1200, which includes a dropdown menu 1202 of presentations that are available for selection to be presented to a viewer computer system 108 that has access to the presentation via the link indicated at 1204. The dropdown menu 1202 may, for example, be presented to a presenter at operation 610, described above with reference to FIG. 6 so as to enable a presenter to select a presentation from a plurality of presentations, and to communicate the selection from the presenter computer system 112 to the presentation server 102. It will also be noted that the live display interface 1200 provides an indication, at 1206, of the number of viewers that are currently participating in the synchronous display of a presentation. Furthermore, a marker control, in the example form of a 'PINS ON' button 1208, and an access control 1210 enable a presenter to use the marker and access control functions described above.

Figure 13:
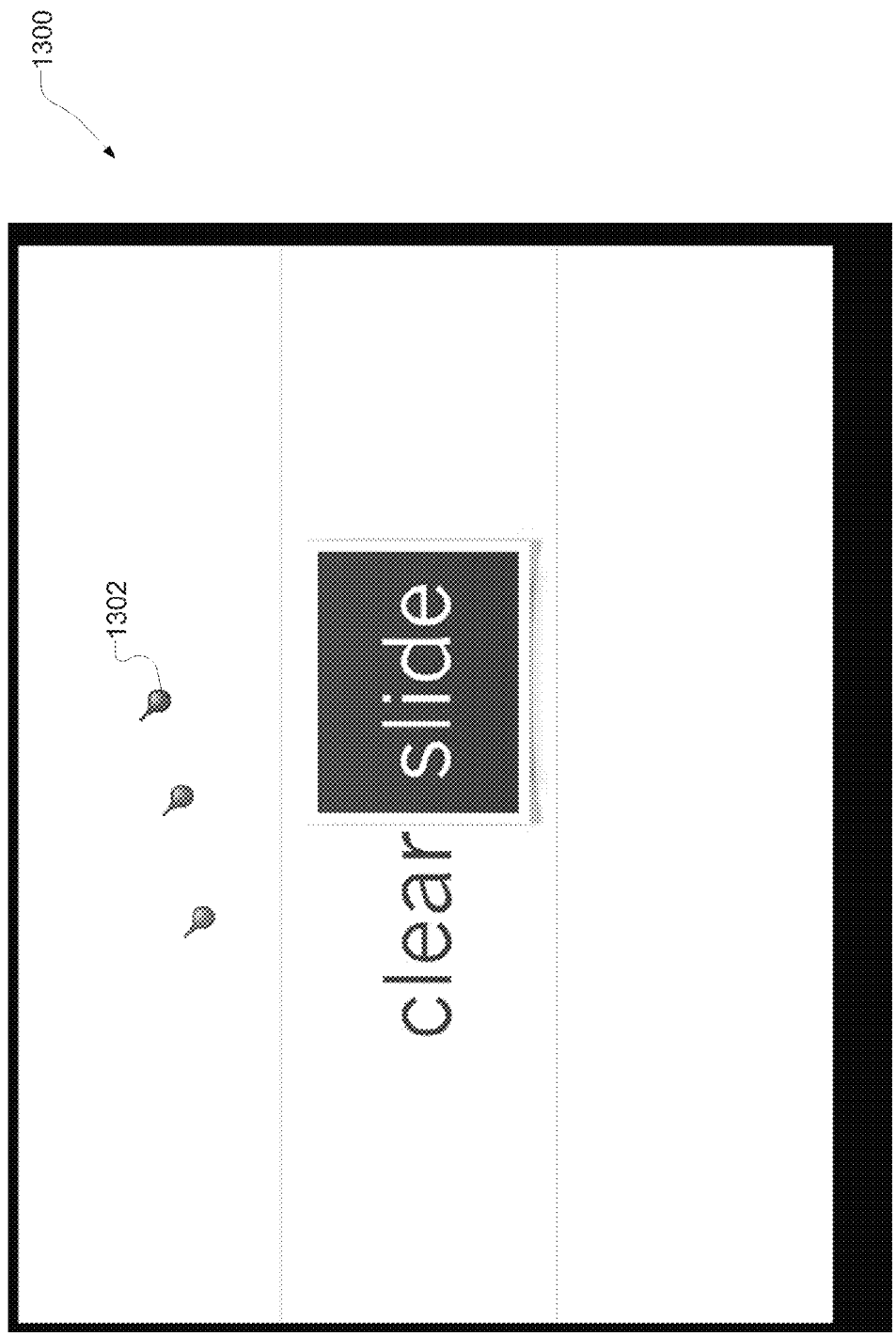
FIG. 13 is a screenshot of an interface, according to some example embodiments, on which marker icons are displayed at locations specified from input received from a presenter computer system.

FIG. 13 is a screenshot of a live display interface 1300, according to example embodiment, on which marker icons 1302 are displayed at locations, within the context of their presentation item, specified by input received from a presenter computer system 112.

Figure 14:
FIG. 14 is a screenshot of an access control interface, according to an example embodiment, that is made available to a presenter computer system.

FIG. 14 is a screenshot of an access controlled interface 1400, according to some example embodiments, that may be provided to a presenter, responsive to selection of the access control 1310 of the interface 1300. Specifically, the access controller interface 1400 provides the presenter with a first option 1402 of requiring no access control, a second option 1404 of using an access control code provided by the presentation server 102, and a third option 1406 of using an access control provided by the presenter.

Figure 15:
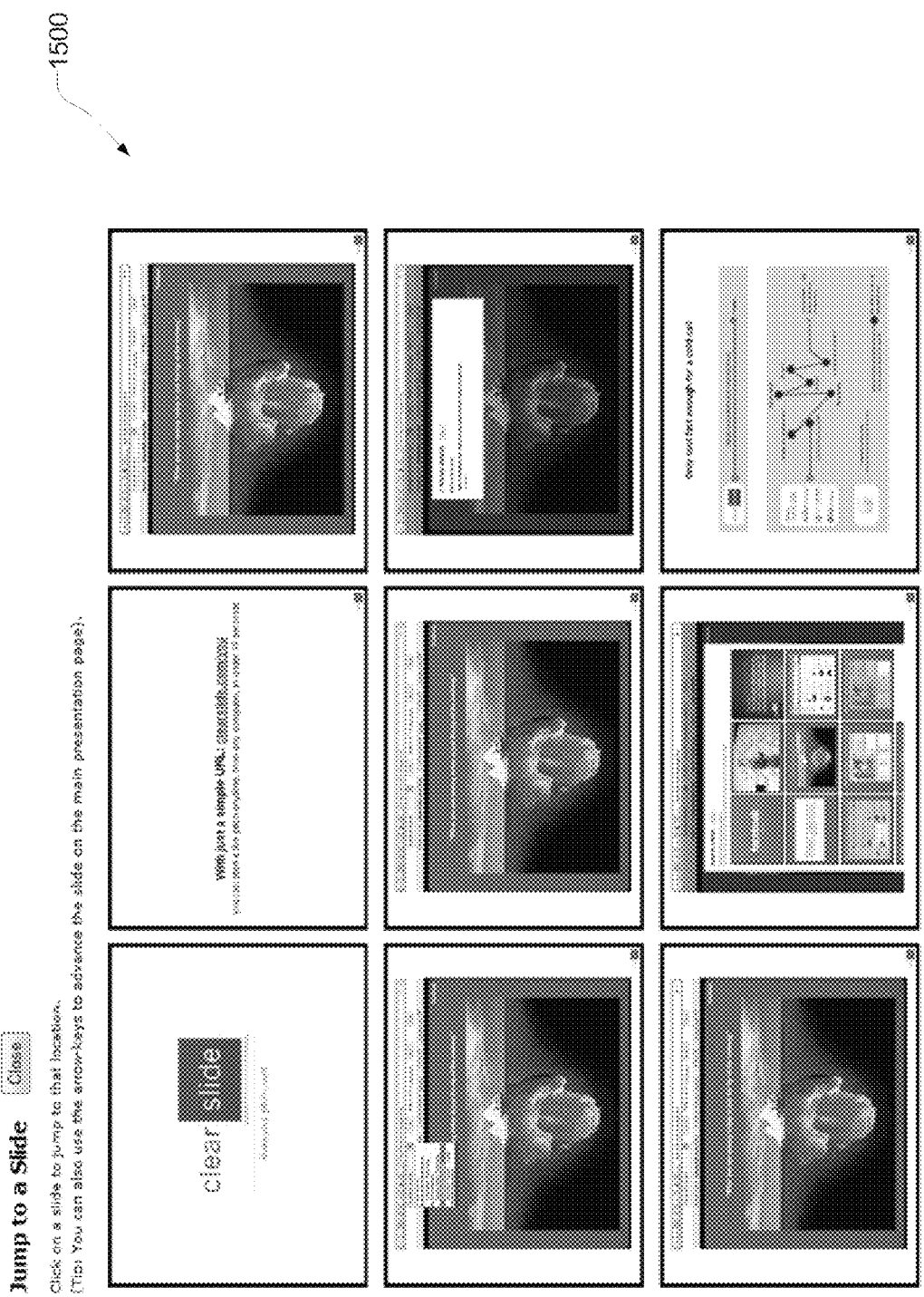
FIG. 15 is a screenshot of a live display slide index interface according to some example embodiments.

FIG. 15 is a screenshot of a live display slide index interface 1500, according to some example embodiments, which provides a thumbnail image index to presentation items being delivered by a presenter operating a presenter computer system 112. Using the index interface 1500, a presenter may select any of the slide thumbnails to 'jump' a presentation to the selected presentation item.

Figure 16:
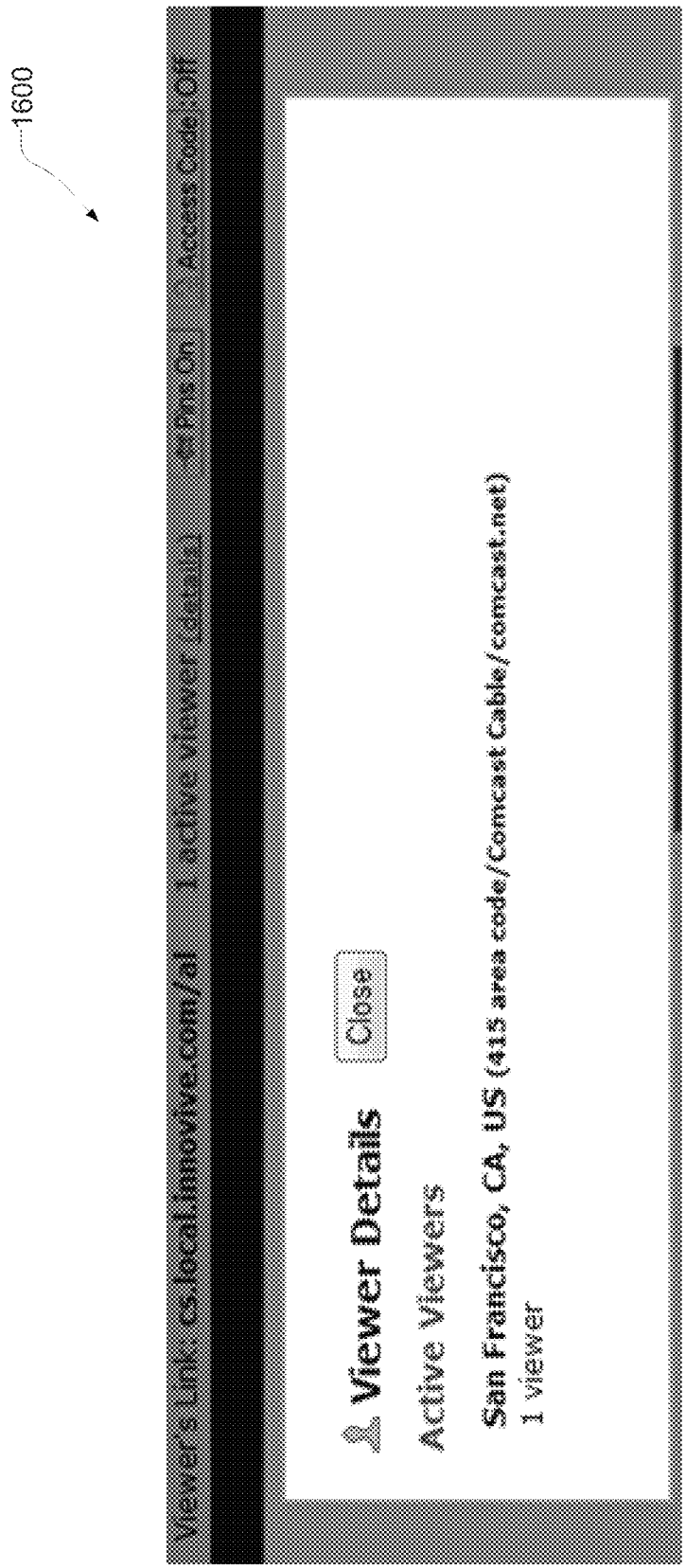
FIG. 16 is a screenshot of a viewer detail interface, according to some example embodiments.
Figure 17:
FIG. 17 is a screenshot of a live display interface, according to some example embodiments, that may be presented to a viewer computer system.
Figure 18:
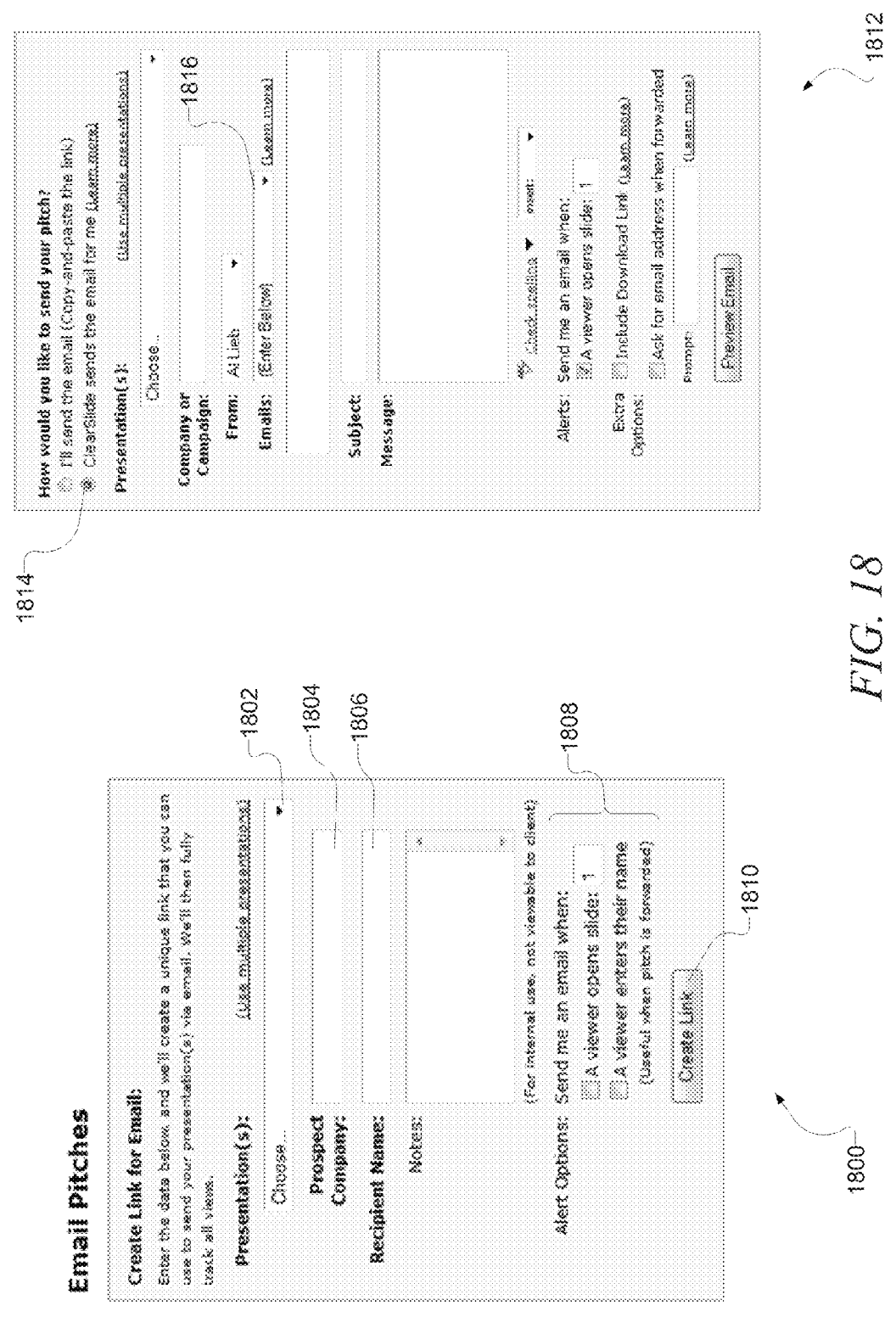
Figure 19:
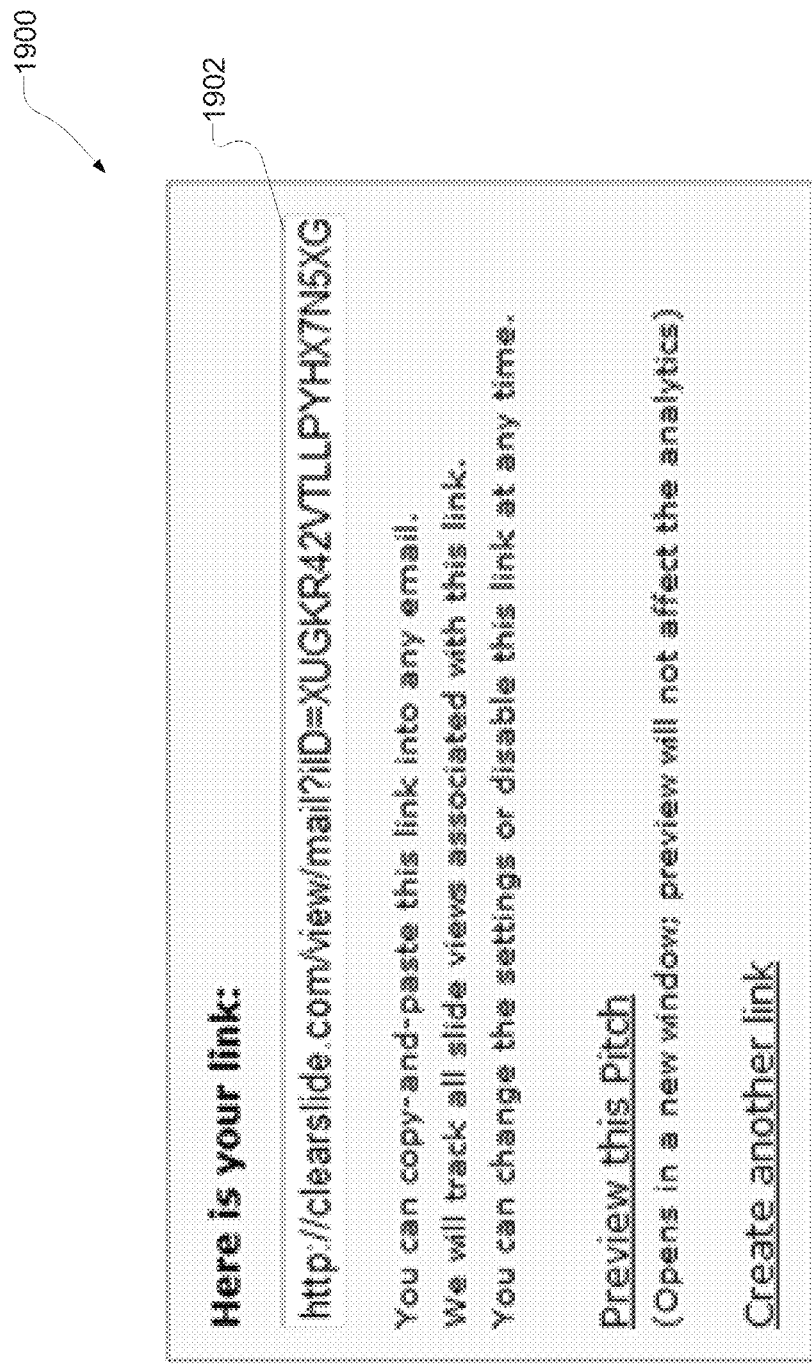
FIG. 19 is a screenshot of a link generation interface, including a link that is generated for an asynchronous presentation, according to some example embodiments.

FIG. 16 is a screenshot of a viewer detail interface 1600, according to some example embodiments, which provides a presenter with details regarding viewers that are actively viewing a live presentation. FIG. 17-19 are screenshots of consecutive interfaces that may be presented to a presenter in order to invite a viewer to an asynchronous (e.g., email) presentation. FIG. 17 displays an introductory email pitch display interface 1700, while FIG. 18 shows screenshots of an email pitch dialogue boxes 1800 and 1812, according to an example embodiment. The email pitch dialogue box 1800 invites a presenter user to create a link that the presenter can send to an invited viewer via e-mail, or another messaging channel. The email pitch dialogue box 1800 includes a drop-down menu 1802 of presentations that a presenter may select to communicate to the viewer, and a company input field 1804, into which a presenter is invited to input the name of the company with which the viewer is associated. Additionally, the presenter, using alert options 1808, may specify alerts to be communicated to the presenter upon certain actions. Finally, a 'create link' button 1810 may be selected by a presenter to create the link (or other access credential), as described above with reference to FIG. 7 that is associated with viewer identification information (e.g., the information inputted into one of the fields 1804 or 1806) and the presentation selected from the drop down menu 1802.

The email pitch dialogue box 1812 invites a presenter to have the presentation server 102 send an email to an invited viewer on behalf of the presenter. To this end, a presenter may select the radio box 1814, and provide one or more e-mail addresses in the e-mail address field 1816. In addition to the specifying that the presentation server 102 should provide an e-mail alert when an invited viewer opens a particular slide, the email pitch dialogue box 1812 enables a presenter to optionally (1) include a download link in the invitation email using which a viewer can download a copy of the presentation, and (2) prompt a further viewer, to which the invited viewer may forward the e-mail, to provide an e-mail address.

FIG. 19 is a screenshot of a link presentation interface 1900 generated for an asynchronous presentation (e.g., an email pitch) according to some example embodiments. A display link 1902 is uniquely associated with a particular presentation/viewer (or recipient) combination, and may be communicated by a presenter to a viewer in the manners described above.

Figure 20:
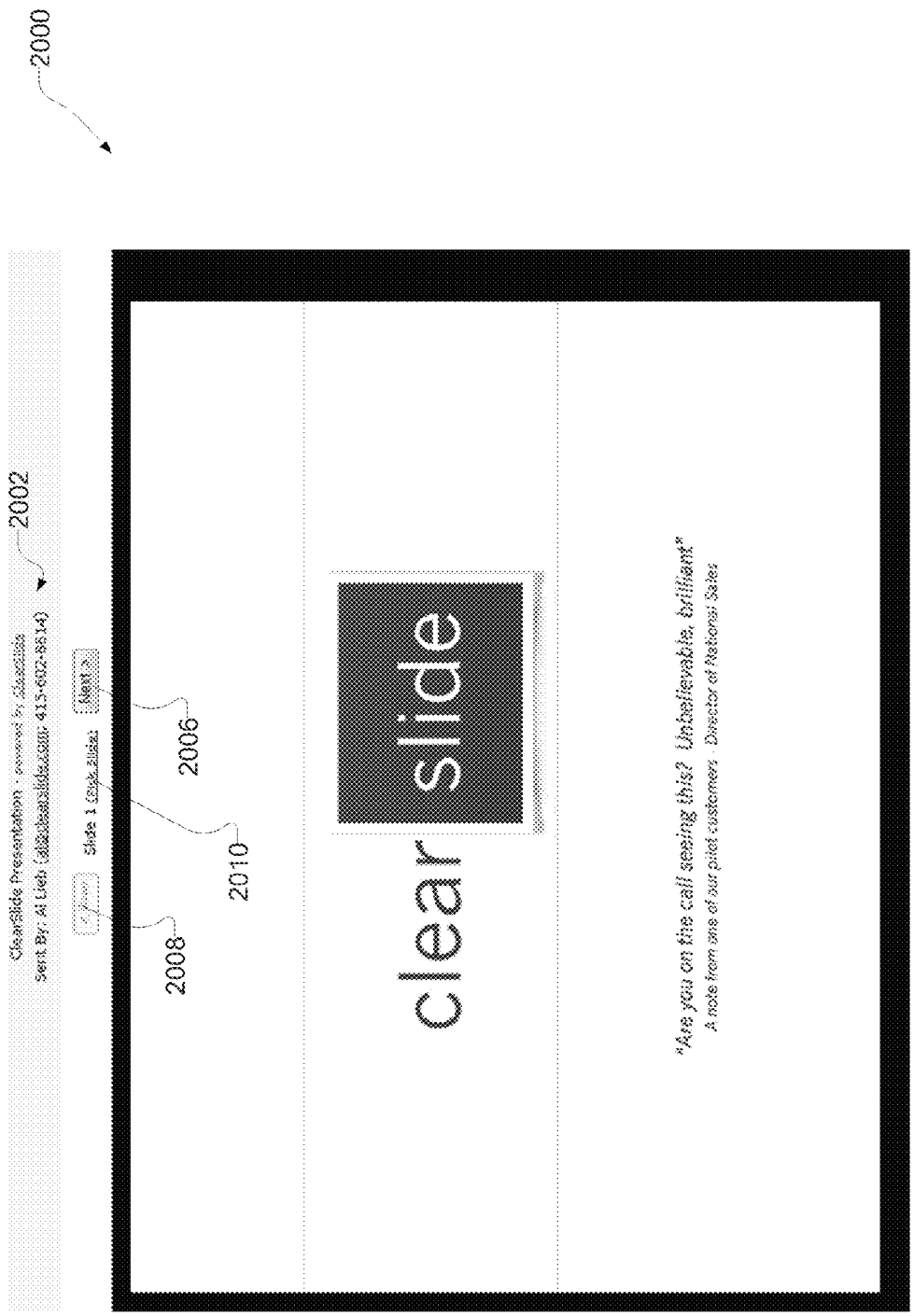
FIG. 20 is a screenshot of an asynchronous display interface, according to some example embodiments, which may be presented to a viewer computer system.
Figure 21:
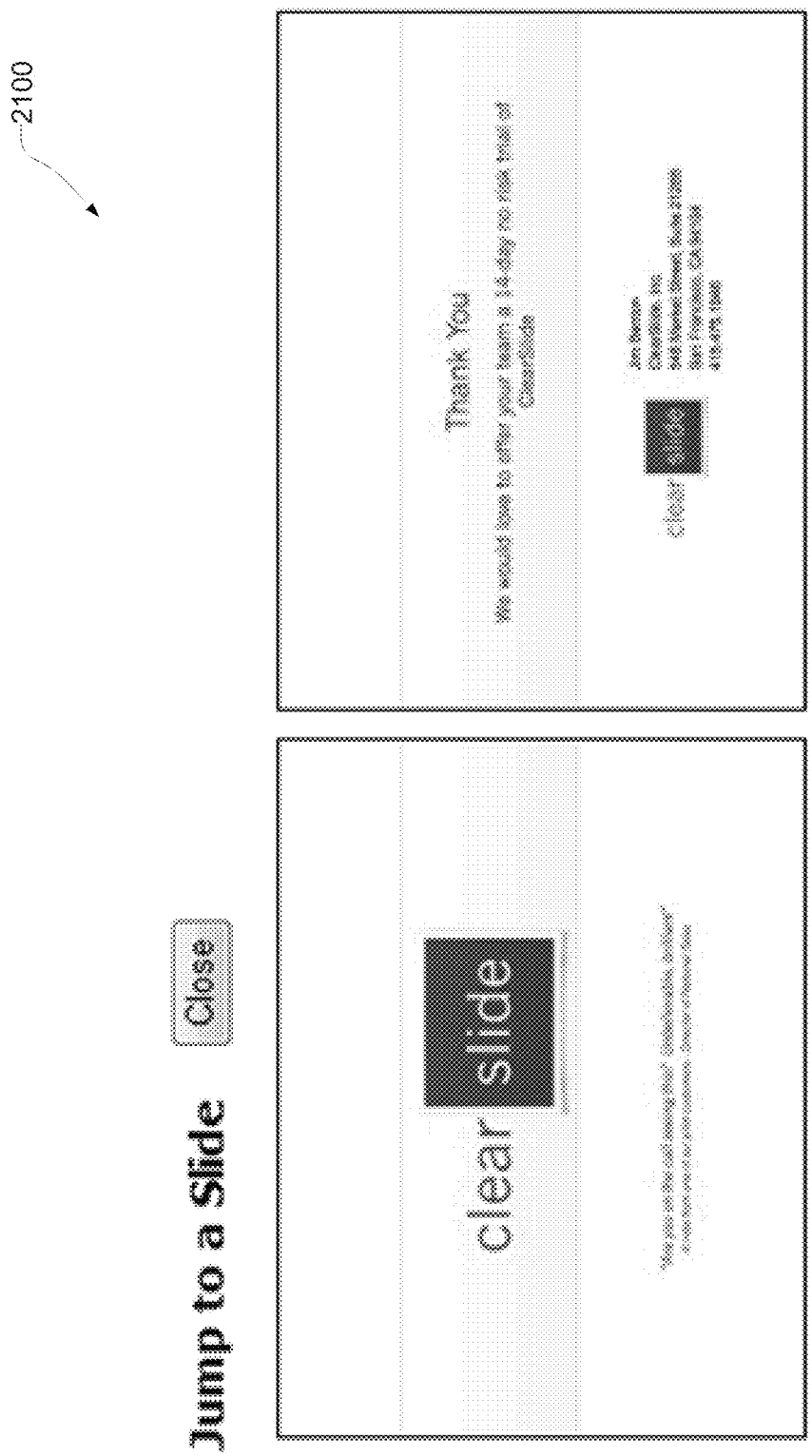
FIG. 21 is a screenshot of an asynchronous slide index interface, according to some example embodiments, which may be presented to a viewer computer system.

FIG. 20 is a screenshot of an asynchronous display interface 2000, which may be presented to a viewer on a viewer computer system 108 responsive to selection of a link (e.g., the dropdown menu 1202). The display interface 2000 is shown to include a presenter identifier 2002 identifying a presenter that may have sent the link 1902 to the relevant viewer. The presenter identifier 2002 may additionally include contact information at which the presenter is contactable. The display interface 2000 further includes navigation controls 2004 which a user may use to navigate through a set of presentation items. Specifically, a next button 2006 allows a viewer to advance to an immediately following presentation item, whereas a previous button 2008 allows a viewer to retreat to an immediately preceding presentation item. Further, a 'pick slide' link 2010 is user selectable to invoke a slide index interface 2100, an example of which is presented in FIG. 21. As with the presenter slide index interface, the slide index interface 2100 presents thumbnails or reduced size representations of presentation items. A user selection of one of the thumbnails in the slide index interface causes the state of the presentation to change so that the presentation item associated with the selected thumbnail becomes the current presentation item.

Figure 22:
FIG. 22 is a screenshot of a statistics interface, according to some example embodiments, which may be presented to a presenter computer system.

FIG. 22 is a screenshot of a statistics interface 2200, according to an example embodiment. The statistics interface 2200, as discussed above, provides a variety of statistics pertaining to presenters, viewers, presentations or individual presentation items.

Figure 23:
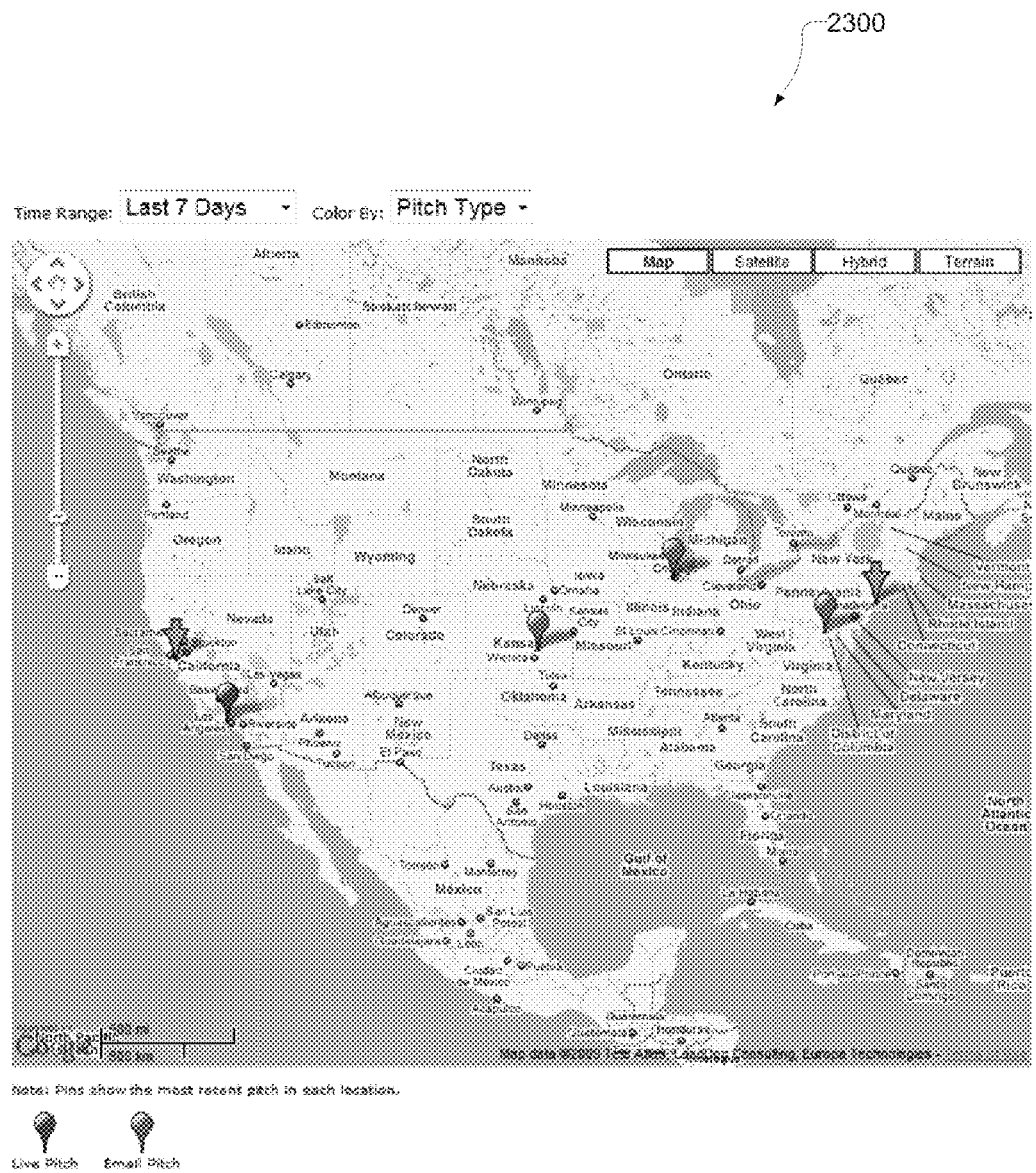
FIG. 23 is a screenshot of a map interface, according to some example embodiments, that may be presented to a presenter computer system.

FIG. 23 is a screenshot of a map interface 2300, according to an example embodiment. Map icons 2302 are presented within the map interface 2300 to represent recently completed live, synchronous and asynchronous presentations. As noted above, the icons 2302 may be colored by a type of display (e.g., live v. email pitch) or by a presenter. Multiple presentations within a particular geographic area may be represented by a single larger icon that is user selectable in order to zoom the view in on the relevant area of the map and to display individual icons which represent individual presentations to viewers at those estimated locations.

Figure 24:
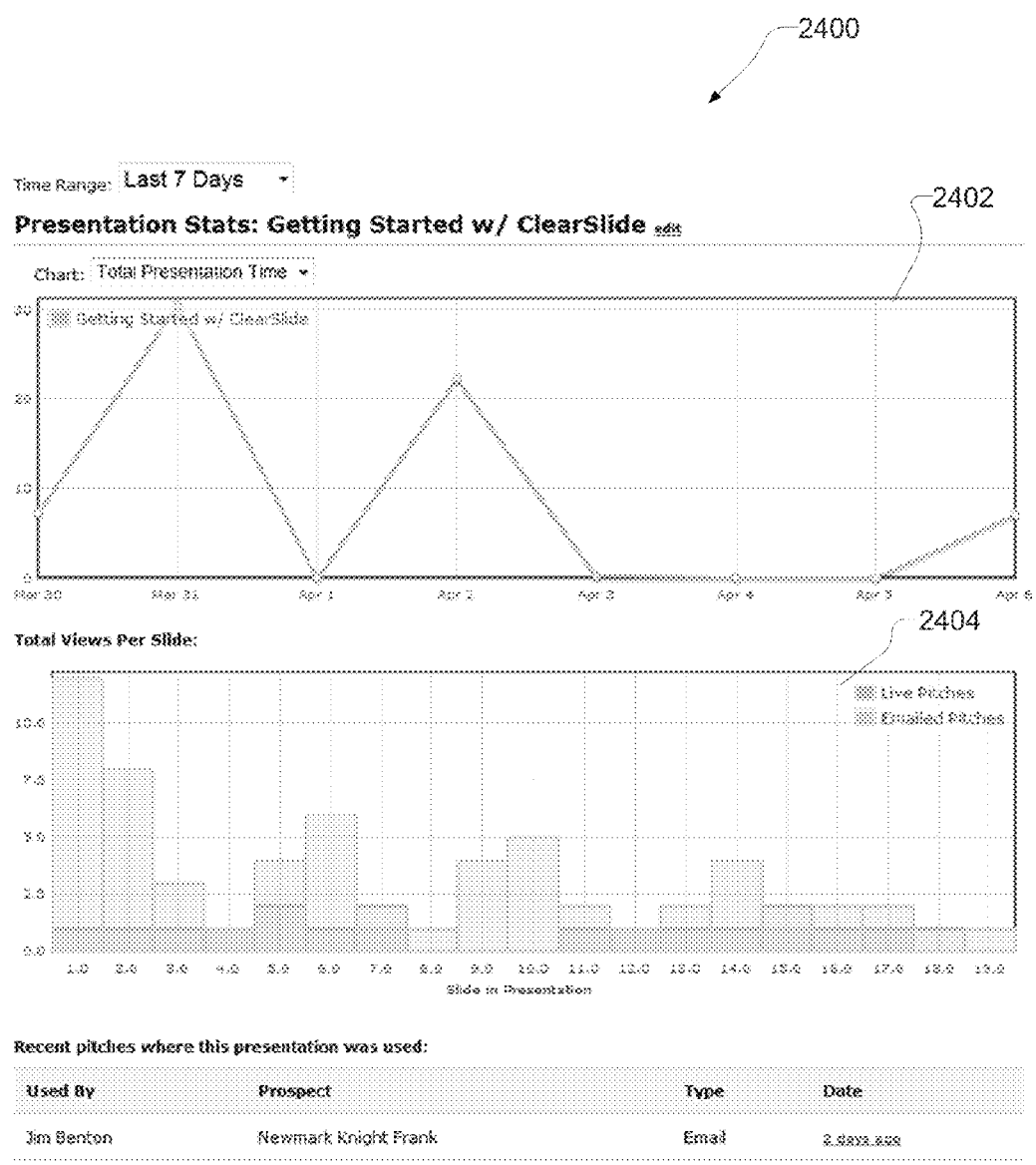
FIG. 24 is a screenshot of a presentation statistics interface, according to some example embodiments, that may be presented to a presenter computer system.

FIG. 24 is a screenshot of a statistics interface 2400 that may be presented for a particular presentation. In the illustrated example interface 2400, statistics relating to a presentation 'getting started' are displayed for a seven-day period. A first chart 2402 displays, for each day within the seven-day time range, a total presentation time for the particular presentation. A second 'total views per slide' chart 2404 displays, for each presentation item (e.g., slide) within a presentation, the number of views, within the seven-day time period for each slide within the 'getting started' presentation. The total views chart 2404 furthermore color differentiates between views that occurred in 'five pitches' and those that occurred in 'emailed pitches'.

Finally a 'recent pitches' table identifies recent 'pitches' in which the 'getting started' presentation was used and identifies the presenter and the viewer involved in the presentation, as well as indicating whether the presentation was a 'five pitch' or an 'email pitch'.

Figure 25:
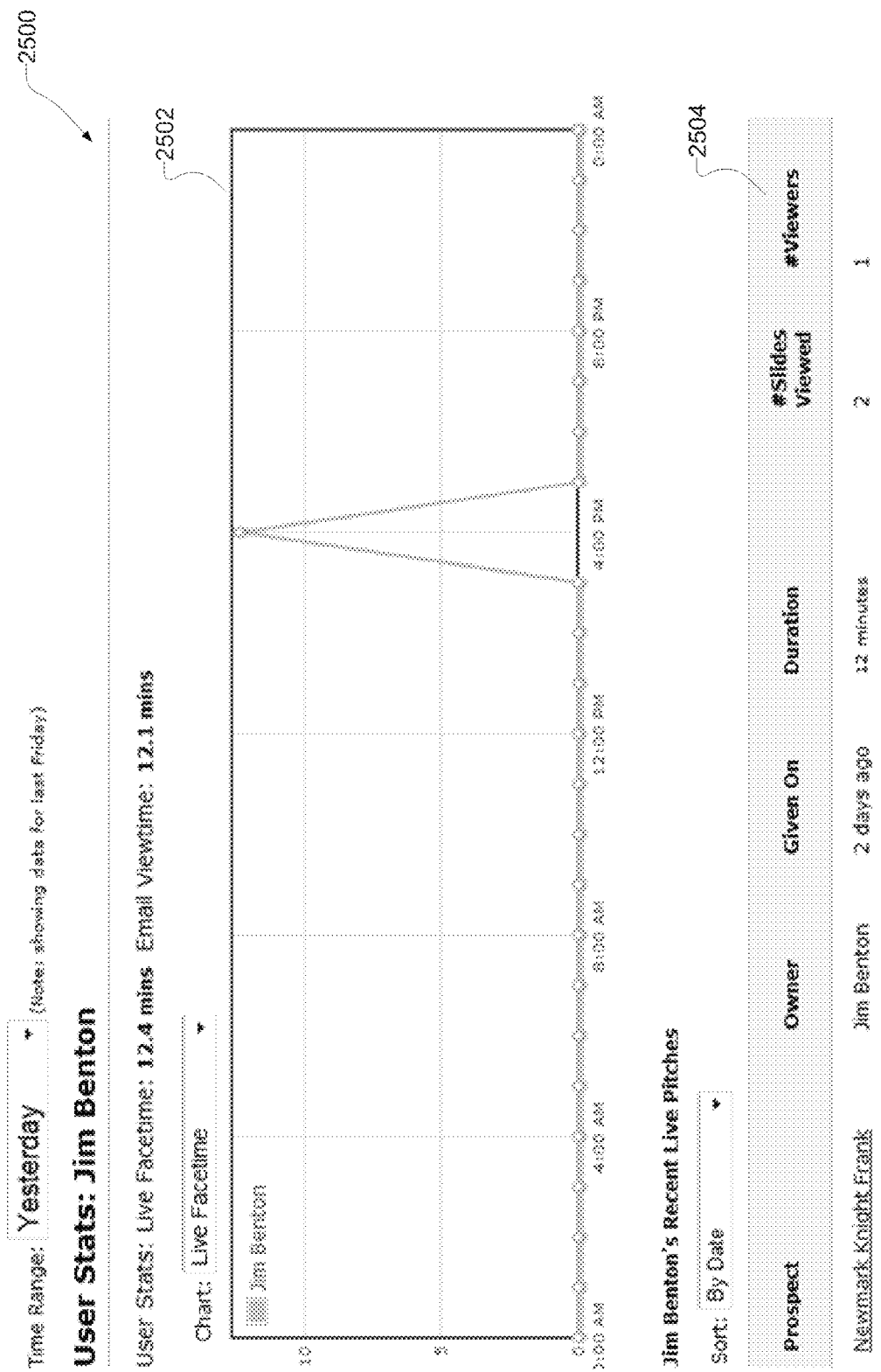
FIG. 25 is a screenshot of a user statistics interface, according to some example embodiments, that may be presented to a presenter computer system.

FIG. 25 is a screenshot of a user statics interface at 2500, which illustrates statistics pertaining to a particular user (e.g., presenter) of the presentation server 102. A live phase time chart 2502 identifies, for a particular user, live phase time in minutes (e.g., a measure of time in which the viewer was deemed to be presented with one or more slides during a live presentation) over a predetermined time interval (e.g., the previous day).

Further, a 'live pitches' table 2504 provides a list of live pitches in which the relevant user has been involved over a determined period, the list being suitable by various criteria (e.g., dates, duration, number of slides viewed, number of viewers) etc.

FIG. 26 is an 'email pitch' interface 2600 which provides historical access details, for a particular presentation. In addition to providing viewer details 2602, the interface 2600 displays a timeline 2604, indicating a time period for each slide that was presented on a viewer computer system 108 during an 'email pitch'. As noted, the exemplary pitch had a total duration of four minutes, 23 seconds, with total 13 slides being viewed. From the visual timeline, it is apparent that the viewer dwelled the longest on the third slide of the 13. The original timeline accordingly provides an indication of which slides a particular viewer found to be worthy of most attention. As stated above, the user can hover the mouse over a specific block in the timeline to see more details above the specific slide displayed and duration.

Figure 27:
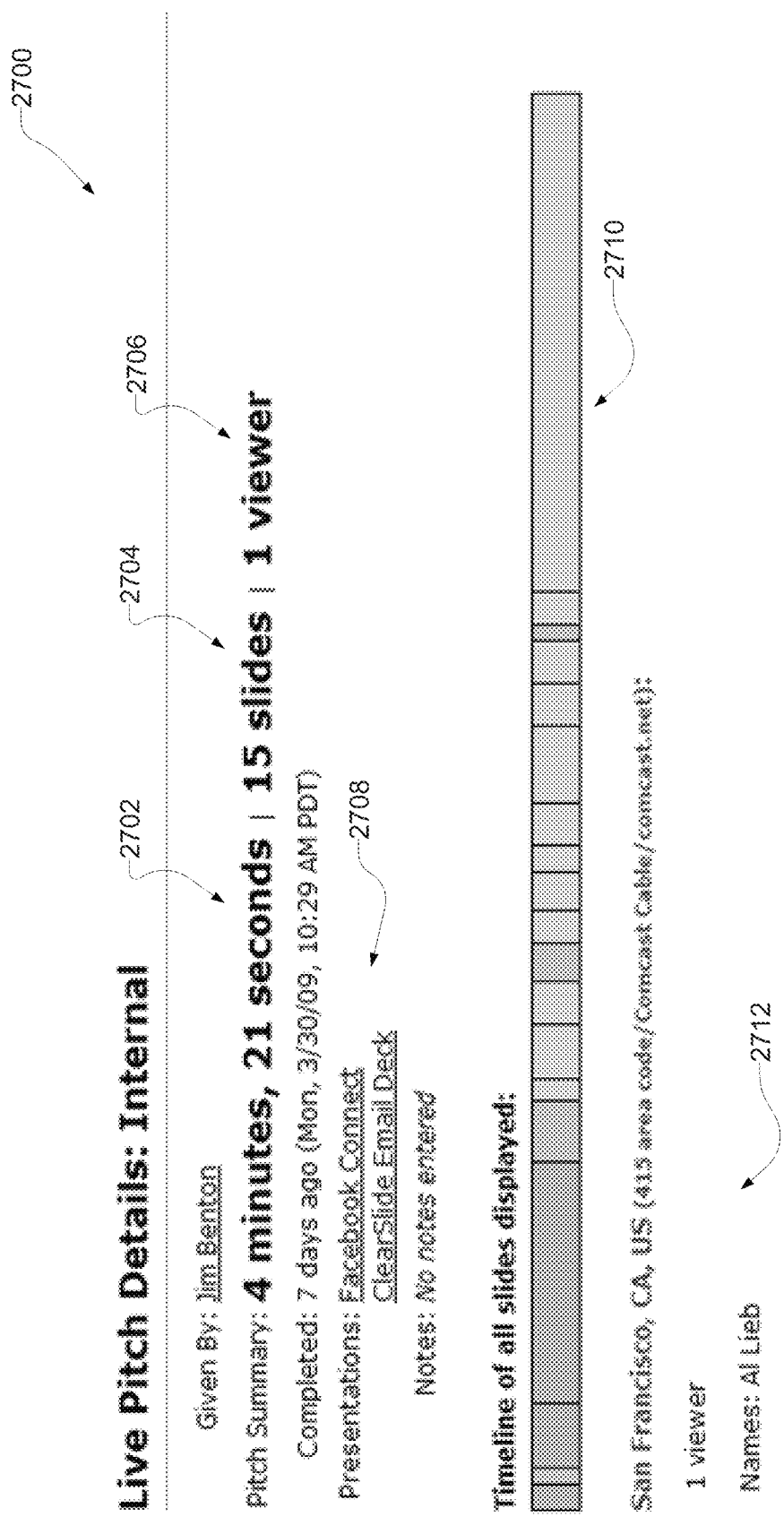
FIG. 27 is a screenshot of a detailed statistics and timeline interface, according to some example embodiments, for a synchronous presentation.

FIG. 27 is 'live pitch' details interface 2700 and provides, for a particular presenter, details of a live pitch made by the presenter. In addition to identifying the presenter, the pitch summary provides a total duration 2702 for the pitch, the number of slides presented during the pitch 2704, and a number of viewers that participates within the pitch 2706. The interface 2700 also identifies (at 2708) which presentations were included within the pitch, and a visual 2710 timeline with respect to each presentation item displayed during the live pitch. Details regarding viewers are also provided at 2712.

FIG. 28 is a screenshot of a latest activity interface 2800, according to an example embodiment. The interface 2800 includes a list of a recent activity for a particular group of users (e.g., a sales team at a particular company) with respect to presentations that are accessible via the presentation server 102.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 29:
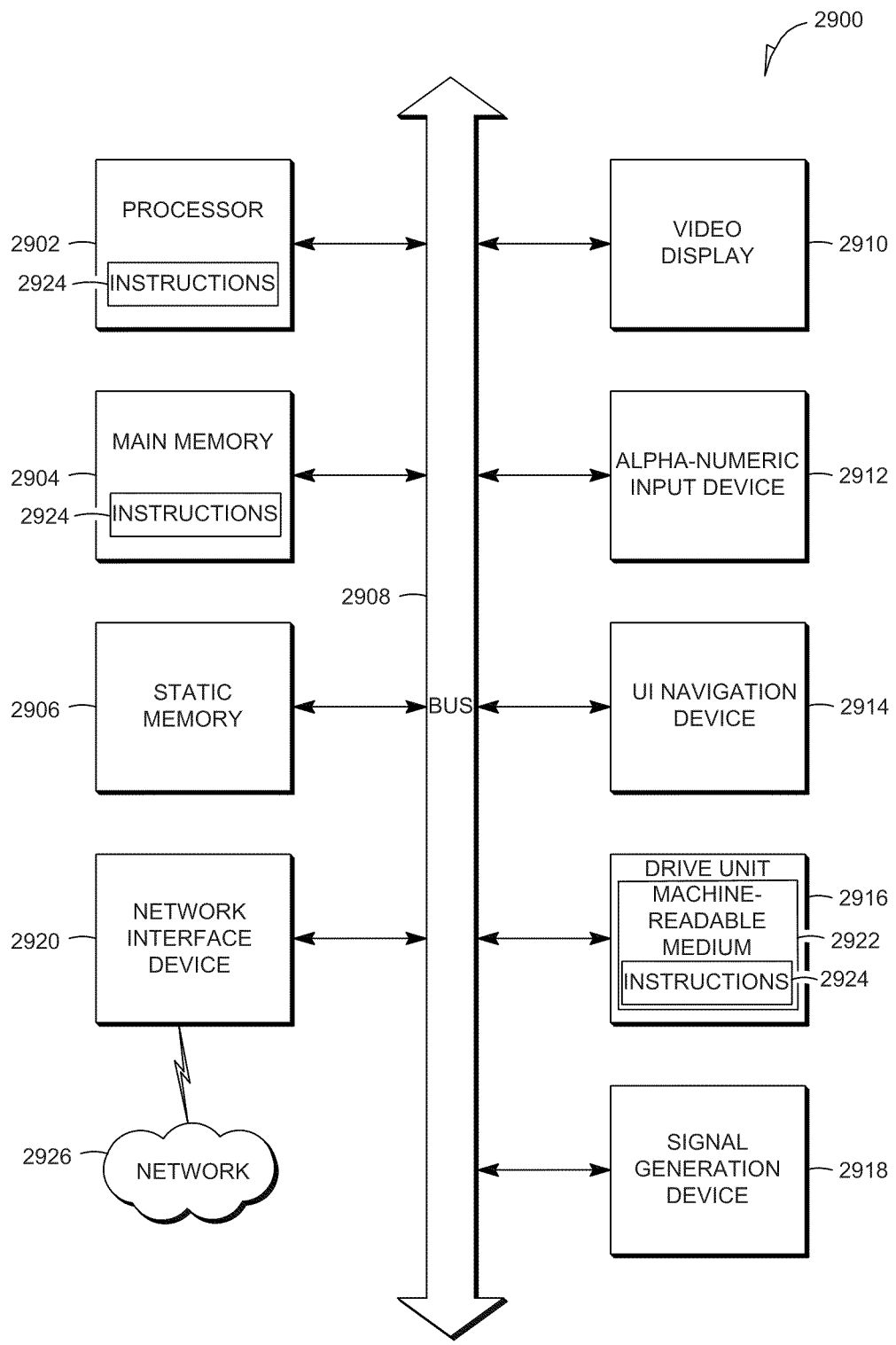
FIG. 29 is a block diagram of a machine, in the example form of a computer system, within which a set of instructions for causing the machine to perform any one of the methods discussed herein may be executed.

FIG. 29 is a block diagram of machine in the example form of a computer system 2900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2900 includes a processor 2902 (e.g., a central processing unit (CPU), a graphics processing unit (GPU) or both), a main memory 2904 and a static memory 2906, which communicate with each other via a bus 2908. The computer system 2900 may further include a video display unit 2910 (e.g., a liquid crystal display (LCD) or a cathode ray tube (CRT)). The computer system 2900 also includes an alphanumeric input device 2912 (e.g., a keyboard), a user interface (UI) navigation device 2914 (e.g., a mouse), a disk drive unit 2916, a signal generation device 2918 (e.g., a speaker) and a network interface device 2920.

Machine-Readable Medium

The disk drive unit 2916 includes a machine-readable medium 2922 on which is stored one or more sets of instructions and data structures (e.g., software) 2924 embodying or used by any one or more of the methodologies or functions described herein. The instructions 2924 may also reside, completely or at least partially, within the main memory 2904 and/or within the processor 2902 during execution thereof by the computer system 2900, the main memory 2904 and the processor 2902 also constituting machine-readable media.

While the machine-readable medium 2922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2924 may further be transmitted or received over a communications network 2926 using a transmission medium. The instructions 2924 may be transmitted using the network interface device 2920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving, at a presentation server, a presentation file from a presenter;

converting the presentation file into a set of discrete presentation items, each item of the set of discrete presentation items being a content type selected from a predetermined set of content types;

(a) in a first mode of operation:

generating, by the presentation server, an access credential that is unique to the presentation file of the presenter, wherein the access credential, when loaded by a computer system of a viewer, enables access to the presentation file by the presentation server transmitting one or more items of the discrete presentation items to the viewer computer system in response to the viewer's control;

detecting an instruction for the presentation file to be viewed asynchronously, wherein the viewer of the presentation file controls a sequence of the set of discrete presentation items;

generating access history data pertaining to the viewer's access to the presentation file, wherein the access history data includes information regarding how long the viewer spends on each of the one or more items of the discrete presentation items;

(b) in a second mode of operation:

generating, by the presentation server, a web link that is unique to the presenter;

upon receiving a request from a viewer, via the web link, for viewing the presentation file synchronously, initiating a synchronous presentation session for the viewer;

transmitting, to a presenter computer system of the presenter, a presenter webpage suitable for loading in a presenter web browser;

enabling, via the presenter webpage, the presenter to select the presentation file from one or more presentation files stored on the presentation server and associated with the presenter, wherein the presenter webpage includes a presenter script using JavaScript that is configured to (1) display the presentation items of the presenter's screen, (2) to receive controls from the presenter so as to establish a presentation state indicating a current presentation item, and (3) to display a rendering of a screen sharing session between the viewer computer system and the presenter computer system, wherein the screen sharing session is initiated by a placeholder presentation item among the presentation items;

transmitting, to the viewer computer system, a viewer webpage suitable for loading in a viewer web browser, wherein the viewer webpage is accessible through a link that is uniquely associated with the presenter, and wherein the viewer webpage includes a viewer script using JavaScript that is configured to automatically display the presentation items, responsive to the presenter controlling a sequence of the presentation items;

after the presenter selects the presentation, transmitting, according to the presentation state indicating the current presentation item, a first presentation item via the viewer script in the viewer webpage to the viewer; and in response to the presenter changing the presentation state indicating the current presentation item, updating the first presentation item with a second presentation item according to a then current presentation state.

2. The method of claim 1, wherein the presentation file is associated with a group of presenter users, and wherein the access history data is generated with respect to the group of presenter users.

3. The method of claim 1, wherein the access credential is a location identifier for a network location at which the presentation file is accessible via a network.

4. The method of claim 1, further comprising: presenting, via a user interface, the access history data to the presenter.

5. The method of claim 1, including providing the access credential to the viewer computer system from the presentation server.

6. The method of claim 1, including providing the access credential to a presenter for communication to the viewer.

7. The method of claim 1, further comprising: receiving viewer identification information to which the presentation file is to be made accessible from the presenter.

8. The method of claim 1, including receiving the access credentials from the viewer computer system and, responsive to receiving the access credentials, presenting the sequence of presentation items to the viewer computer system, according to a determinable sequence via the presentation server.

9. The method of claim 8, comprising presenting an index to the sequence of presentation items to the viewer computer system, receiving a selection input from the viewer computer system of a current presentation item of the sequence of presentation items, and responsive to the selection input, presenting the selected presentation item to the viewer computer system.

10. The method of claim 9, wherein the index to the sequence of presentation items comprises a sequence of thumbnail images corresponding to the sequence of presentation items.

11. The method of claim 9, comprising determining that the sequence of presentation items have been presented to the viewer computer system, and selectively presenting the index to the sequence of presentation items to the viewer based on the determination.

12. The method of claim 1, comprising presenting a specific presentation item of the sequence of the set of discrete presentation items to the viewer computer system and pre-loading a further presentation item of the sequence to a viewer computer system prior to the display thereof.

13. The method of claim 1, including receiving, from the viewer computer system, a download request to download a copy of the presentation file from the presentation server to the viewer computer system, and responsive to the download request, automatically creating a downloadable copy of the presentation file as a single file.

14. The method of claim 1, further comprising: upon the viewer accessing the presentation file, transmitting an electronic message that notifies the presenter of the viewer's access.

15. The method of claim 14, wherein the access history data includes at least one of an estimated geographic location of the viewer computer system, and date and time information of the access by the viewer computer system.

16. The method of claim 1, further comprising: upon the viewer concludes the access to the presentation file, transmitting an electronic message including the access history data to the presenter.

17. The method of claim 1, including receiving, at the presentation server, modification data to modify the presentation file, and modifying the presentation file using the modification data while retaining the access credential as valid to access the presentation.

18. The method of claim 17, wherein the modification data is to substitute the presentation file with a further presentation file stored at the presentation server.

19. A presentation server system having a processor that is configured to perform a method comprising:

receiving, at a presentation server, a presentation file from a presenter;

converting the presentation file into a set of discrete presentation items, each item of the set of discrete presentation items being a content type selected from a predetermined set of content types;

(a) in a first mode of operation:

generating, by the presentation server, an access credential that is unique to the presentation file of the presenter, wherein the access credential, when loaded by a computer system of a viewer, enables access to the presentation file by the presentation server transmitting one or more items of the discrete presentation items to the viewer computer system in response to the viewer's control;

detecting an instruction for the presentation file to be viewed asynchronously, wherein the viewer of the presentation file controls a sequence of the set of discrete presentation items;

generating access history data pertaining to the viewer's access to the Presentation file, wherein the access history data includes information regarding how long the viewer spends on each of the one or more items of the discrete presentation items;

(b) in a second mode of operation:

generating, by the presentation server, a web link that is unique to the presenter;

upon receiving a request from a viewer, via the web link, for viewing the presentation file synchronously, initiating a synchronous presentation session for the viewer;

transmitting, to a presenter computer system of the presenter, a presenter webpage suitable for loading in a presenter web browser;

enabling, via the presenter webpage, the presenter to select the presentation file from one or more presentation files stored on the presentation server and associated with the presenter, wherein the presenter webpage includes a presenter script using JavaScript that is configured to (1) display the presentation items of the presenter's screen, (2) to receive controls from the presenter so as to establish a presentation state indicating a current presentation item, and (3) to display a rendering of a screen sharing session between the viewer computer system and the presenter computer system, wherein the screen sharing session is initiated by a placeholder presentation item among the presentation items;

transmitting, to the viewer computer system, a viewer webpage suitable for loading in a viewer web browser, wherein the viewer webpage is accessible through a link that is uniquely associated with the presenter, and wherein the viewer webpage includes a viewer script using JavaScript that is configured to automatically display the presentation items, responsive to the presenter controlling a sequence of the presentation items;

after the presenter selects the presentation, transmitting, according to the presentation state indicating the current presentation item, a first presentation item via the viewer script in the viewer webpage to the viewer; and in response to the presenter changing the presentation state indicating the current presentation item, updating the first presentation item with a second presentation item according to a then current presentation state.

20. The system of claim 19, wherein the presentation file is associated with a group of presenter users, and wherein the tracker configured to generate the access history data with respect to the group of presenter users.

21. The system of claim 19, wherein the access credential is generated in the form of a location identifier for a network location at which the presentation file is accessible via a network.

22. The system of claim 19, further configured to perform a method comprising: presenting, via a presenter interface configured, the access history data to the presenter.

23. The system of claim 19, further configured to perform a method comprising: providing the access credential to the viewer computer system from the presentation server.

24. The system of claim 19, further configured to perform a method comprising: providing the access credential to a presenter computer system for communication to the viewer computer system.

25. The system of claim 19, further configured to perform a method comprising: receiving viewer identification information to which the presentation file is to be made accessible from a presenter computer system.

26. The system of claim 19, further configured to perform a method comprising: receiving the access credentials from the viewer computer system and, responsive to receiving the access credentials, presenting the sequence of discrete presentation items to the viewer computer system, according to a determinable sequence.

27. The system of claim 26, further configured to perform a method comprising: presenting an index to the sequence of discrete presentation items to the viewer computer system, the viewer interface is configured to receive a selection input from viewer computer system of a current presentation item of the sequence of presentation items, and the presentation output module is configured, responsive to the selection input, to present the selected presentation item to the viewer computer system.

28. The system of claim 27, wherein the index to the sequence of presentation items comprises a sequence of thumbnail images corresponding to the sequence of presentation items.

29. The system of claim 27, further configured to perform a method comprising: determining that the sequence of presentation items have been presented to the viewer computer system, and selectively to present the index to the sequence of presentation items to the viewer based on the determination.

30. The system of claim 19, further configured to perform a method comprising: presenting a specific presentation item of the sequence of the set of discrete presentation items to the viewer computer system and to pre-load a further presentation item of the sequence to a viewer computer system prior to the display thereof.

31. The system of claim 19, further configured to perform a method comprising: receiving from the viewer computer system, a download request to download a copy of the presentation file to the viewer computer system, and responsive to the download request, is configured to generate a downloadable copy of the presentation file as a single file.

32. The system of claim 19, further configured to perform a method comprising: upon the viewer accessing the presentation file, transmit an electronic message that notifies the presenter of the viewer's access.

33. The system of claim 32, wherein the access history data includes at least one of an estimated geographic location of the viewer computer system, and date and time information of the access by the viewer computer system.

34. The system of claim 19, further configured to perform a method comprising: upon the viewer concludes the access to the presentation file, transmit an electronic message including the access history data to the presenter.

35. The system of claim 19, further configured to perform a method comprising: receiving, at the presentation server, modification data to modify the presentation file, and modify the presentation using the modification data while retaining the access credential as valid to access the presentation.

36. The system of claim 35, wherein the modification data is to substitute the presentation file with a further presentation file stored at the presentation server.

* * * * *